455-609
FIP8106

AU 233 EX
XR 4,142,773

United States Patent [19]
Avramenko et al.

[11] 4,142,773
[45] Mar. 6, 1979

[54] METHOD FOR TRANSMITTING TWO-DIMENSIONAL INFORMATION AND SYSTEM FOR EFFECTING SAME

[76] Inventors: Rimily F. Avramenko, Baltiiskaya ulitsa, 4, kv. 46; Valentina I. Nikolaeva, Leningradsky prospekt, 48, kv. 94; Leonid A. Orlov, ulitsa Dimitrova, 22/2, kv. 33, all of Moscow, U.S.S.R.

[21] Appl. No.: 813,690

[22] Filed: Jul. 7, 1977

Related U.S. Application Data

[63] Continuation of Ser. No. 658,618, Feb. 17, 1976, abandoned, which is a continuation of Ser. No. 537,769, Dec. 31, 1974, abandoned.

[30] Foreign Application Priority Data

Jun. 21, 1974 [SU] U.S.S.R. ............................. 2032052

[51] Int. Cl.² .................... G02B 27/00; H04B 9/00
[52] U.S. Cl. ................................. 350/3.78; 250/199; 350/3.68; 350/3.82
[58] Field of Search ................ 350/3.6, 3.78; 178/22, 178/50; 250/199

[56] References Cited

U.S. PATENT DOCUMENTS

| | | | |
|---|---|---|---|
| 3,449,577 | 6/1969 | Kogelnik | 350/3.5 |
| 3,567,324 | 3/1971 | Brooks | 350/3.5 |
| 3,752,992 | 8/1973 | Fluhr | 250/199 |
| 3,899,430 | 8/1975 | Ancker et al. | 250/199 |
| 3,909,102 | 9/1975 | Tsunoda et al. | 350/3.5 |
| 3,953,727 | 4/1976 | D'Auria et al. | 250/199 |

OTHER PUBLICATIONS

Goodman et al., *Applied Optics*, vol. 8, No. 8, Aug. 1969, pp. 1581–1586.
Hill et al., *Journal of the Optical Society of America*, vol. 61, No. 3, Mar. 1971, pp. 399–402.

*Primary Examiner*—John K. Corbin
*Assistant Examiner*—John D. Lee
*Attorney, Agent, or Firm*—Holman & Stern

[57] ABSTRACT

A method is disclosed for transmitting two-dimensional information about an object with the aid of a two-dimensional reference signal and a two-dimensional useful signal through an optical communication line. The two-dimensional useful signal is formed by two-dimensional spatial modulation of a coherent light flux. The two-dimensional reference signal is displaced with respect to the two-dimensional useful signal by a time interval which is not in excess of the time instability interval of the communication line. A hologram is recorded at the output of the communication line, of the two-dimensional useful signal matched in time and space with the two-dimensional reference signal. A Fourier hologram can be made of the two-dimensional useful signal and the two-dimensional reference signal in relation to the two-dimensional reference signal, which, when reproduced, makes it possible to obtain the undistorted two-dimensional information that has been transmitted. In addition, a system is disclosed for transmitting two-dimensional information at optical frequencies in accordance with the above method.

18 Claims, 17 Drawing Figures

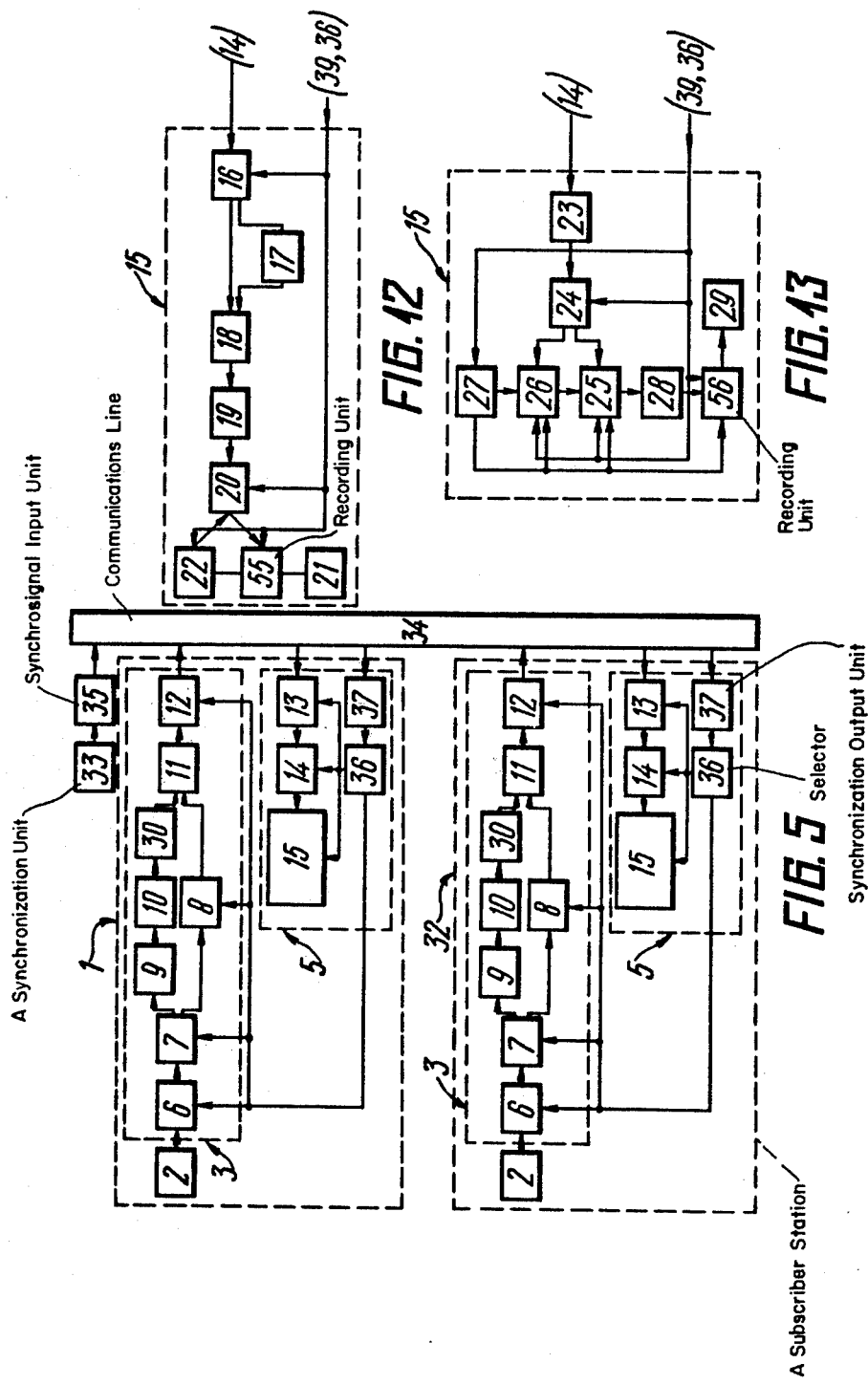

METHOD FOR TRANSMITTING TWO-DIMENSIONAL INFORMATION AND SYSTEM FOR EFFECTING SAME

This is a continuation of application Ser. No. 658,618, filed Feb. 17, 1976 which in turn is a continuation of application Ser. No. 537,769, filed Dec. 31, 1974, both now abandoned.

FIELD OF THE INVENTION

The present invention relates to optoelectronics and, more specifically, to methods for transmitting two-dimensional information and to systems for transmitting two-dimensional information at optical frequencies in accordance with these methods. These methods and systems are applicable to television, videotelephone communication lines, and communication systems for transmitting any type of two-dimensional information.

BACKGROUND OF THE INVENTION

The prior art includes a method for transmitting two-dimensional information, which comprises the steps of decomposing an image being transmitted element by element, subsequent time or phase modulation of a coherent light flux in accordance with the successive elements of the decomposed image as the image is being scanned, transmission of the time-modulated light flux through an optical communication line, demodulation thereof as it is being received, and reproducing a visible image.

The foregoing method is disadvantageous in that the transmission of two-dimensional information involves decomposing, element by element, the image being transmitted. As a result, it takes a substantial amount of time to transmit a complete two-dimensional image.

The prior art includes a system for transmitting two-dimensional information according to the foregoing method, which comprises means and units arranged along the path of the coherent light flux, said means and units including a coherent light source, an amplitude or phase modulator which modulates the light flux in time in accordance with a useful signal formed in a unit for decomposing element by element, the two-dimensional image being transmitted, a communication line which is free space, and receiving means for the demodulation of received signals and reproduction of a visible two-dimensional image.

The foregoing system is disadvantageous in that it takes a substantial amount of time to transmit a two-dimensional image, because at each given moment the signal being transmitted carries information only on one element of the decomposed image that is being transmitted. In addition, no provision is made in this system for compensation of distortions due to variable nonuniformities of the medium in which the information-carrying light flux travels.

The prior art also includes a system for transmitting two-dimensional information in accordance with the above-mentioned method, wherein the medium for propagation of time-modulated light signals is a glass, fiber-optic light guide.

This system has the same disadvantages as the one in which free space is used as the light signal propagation medium. It should also be added that glass, fiber-optic light guides are marked by great signal attenuation.

The prior art includes still another system for transmitting two-dimensional information in accordance with the above-mentioned method, wherein the function of the medium for propagation of time-modulated light signals is performed by a light pipe with a number of beam-guiding lenses or mirrors.

The foregoing system has the same disadvantages as the one where free space serves as the medium for propagation of light signals.

In addition, all the above systems prove to be very expensive in transmitting information over long distances.

The prior art further includes a method for parallel transmission of a two-dimensional image over a distance of up to several meters, wherein amplitude modulation of a light flux is carried out by means of a bundle of wavebeam guides, each of these guides transmitting a light signal corresponding to a separate element of a decomposed image being transmitted.

The prior art includes a system for parallel transmission of two-dimensional images in accordance with the foregoing method, which comprises means and units successively arranged along the path of a light flux, these means and units including a light source, a unit for light signal modulation, a bundle of light guides whose number must correspond to that of the elements of a decomposed image being transmitted, and receiving means to ensure visual observation of, or to record, the image being transmitted.

The latter prior art method and system for parallel transmission of two-dimensional images have the following disadvantages:

great signal attenuation in transmitting over long distances;

difficulties involved in joining together light guides at the input and output of the communication line;

impossibility of spatial phase modulation of the light flux;

difficulties involved in maintaining communication among a great number of subscribers.

OBJECTS OF THE INVENTION

It is an object of the present invention to provide a method for transmitting two-dimensional information, which makes it possible to carry out parallel transmission of two-dimensional information over distances as long as scores and even hundreds of kilometers in the presence of variable random distortions in the communication line.

It is another object of the present invention to provide a system for transmitting two-dimensional information at optical frequencies in accordance with the above method, which system ensures parallel multiplex transmission of two-dimensional information involving a great number of subscribers.

It is still another object of the present invention to provide a system for transmitting two-dimensional information at optical frequencies in accordance with the foregoing method, which system minimizes losses in the course of light signal propagation.

It is yet another object of the present invention to provide a system for transmitting two-dimensional information at optical frequencies in accordance with the foregoing method, which system ensures compensation of distortions due to the communication line.

An additional object of the present invention is to provide a system for transmitting two-dimensional information at optical frequencies, which system has a great traffic capacity.

SUMMARY OF THE INVENTION

The foregoing and other objects of the present invention are attained by providing a method for transmitting two-dimensional information about an object. The information is a two-dimensional useful signal transmitted through a communication line by means of a coherent light flux. The two-dimensional useful signal is formed, in accordance with the invention, by means of two-dimensional spatial modulation of the coherent light flux. A two-dimensional reference signal is successively transmitted through the communication line, the two-dimensional reference signal is displaced with respect to said two-dimensional useful signal by a time interval which is not in excess of the time instability interval of the communication line. The two-dimensional reference signal and the two-dimensional useful signal are jointly processed at the output of the communication line. The processing ensures compensation of identical distortions introduced by the communication line into the two-dimensional useful signal and said two-dimensional reference signal.

In the case of communication lines which produce distortions similar to those due to what is known as the "ground glass effect", it is expedient that combined processing of the two-dimensional reference signal and the two-dimensional useful signal be carried out by matching in time and space and received two-dimensional useful signal and the received two-dimensional reference signal and recording a hologram of the received two-dimensional useful signal in relation to the received two-dimensional reference signal. This hologram makes it possible to reproduce the undistorted two-dimensional information that has been transmitted.

In transmitting two-dimensional information over long distances, when the approximation of the communication line by the "ground glass" transmission function is inapplicable, it is expedient that combined processing of the two-dimensional reference signal and the two-dimensional useful signal be carried out by recording a Fourier hologram of the two-dimensional reference signal relative to an additional two-dimensional reference signal with subsequent modulation of the additional coherent light flux by the Fourier holograms and inverse Fourier transformation of the modulated light flux. This makes it possible to reproduce the undistorted two-dimensional information that has been transmitted.

In order to reduce the effects of regular nonuniformities of the communication line upon the reproduction quality of the information being transmitted, cut down the required dynamic range of the hologram recording means and ensure image retrieval from any portion of the communication line aperture, it is desirable that periodic spatial randomization of the two-dimensional reference signal and two-dimensional useful signal be carried out.

In order to transmit a two-dimensional color image, it is expedient that the two-dimensional reference signal and the two-dimensional useful signal be additionally formed on at least two subcarrier frequencies.

In order to transmit a three-dimensional image of an object, it is practicable that preliminary recording of a two-dimensional hologram of said object be carried out prior to the formation of the two-dimensional useful signal, the two-dimensional hologram then being used for two-dimensional spatial modulation of the coherent light flux. The combined processing of the received two-dimensional reference signal and the received two-dimensional useful signal is accompanied by additional restoration of the three-dimensional image of the object according to the hologram.

The proposed system for transmitting two-dimensional information at optical frequencies in accordance with the proposed method for transmission of two-dimensional information comprises a subscriber station, wherein a coherent light flux travels successively through transmitting means and a communication line to receiving means. In this system, the transmitting means comprises, according to the invention, a number of units arranged successively along the path of the coherent light flux, which include switching means for successively forming from the coherent light flux, two-dimensional light pulses corresponding to the two-dimensional reference signal and the two-dimensional useful signal, which useful signal carries two-dimensional information being transmitted. The total duration of the reference signal and the useful signal is not in excess of the time instability interval of the communication line. The transmitting means further comprises a spatial separation unit which directs said light pulses to a two-dimensional reference signal channel and a two-dimensional useful signal channel, respectively. The two-dimensional reference signal channel comprises a reference signal forming unit receiving a light pulse sent from the spatial separation unit, the light pulse corresponding to the two-dimensional reference signal. The two-dimensional useful signal channel comprises a modulator which receives from the spatial separation unit a light signal corresponding to the two-dimensional useful signal and modulates the light pulse by the two-dimensional useful signal. The two-dimensional useful signal channel also comprises a unit for optimum matching of the spatial spectrum of the two-dimensional useful signal with the two-dimensional operator of the transmission function of the communication line, the optimum matching unit receiving signals sent by said modulator. The transmitting means further comprises, in successive arrangement along the path of the coherent light flux, a unit for spatial matching of the two-dimensional reference signal and the two-dimensional useful signal, which receives the two-dimensional reference signal and the two-dimensional useful signal from the two-dimensional reference signal channel and the two-dimensional useful signal channel, respectively, and a controlled unit for the input of the two-dimensional reference signal and the two-dimensional useful signal to the communication line, which signals arrive from the spatial matching unit. The receiving means comprises, in successive arrangement along the path of the coherent light flux, a controlled unit for the output of the two-dimensional reference signal and the two-dimensional useful signal from the communication line, a switching means which discriminates in time the two-dimensional reference signal and the two-dimensional useful signal, and a unit for processing these signals. This processing unit compensates distortions introduced by the communication line into the two-dimensional information being transmitted, and also records and reproduces that information.

In order to compensate distortions due to the communication line and reproduce the two-dimensional information being transmitted, the unit for processing the two-dimensional useful signal and the two-dimensional reference signal may include, in successive arrangement along the path of the coherent light flux, a unit for spatially directing the signals to the two-dimensional useful signal channel and the two-dimensional reference signal channel, respectively, and a unit for spatial matching of the two-dimensional useful signal and the two-dimensional reference signal, these signals arriving at the matching unit from their respective channels. One of the channels must comprise a delay unit which is intended for matching in time the two-dimensional useful signal and the two-dimensional reference signal. The processing unit may further comprise means for recording a hologram of the two-dimensional useful signal, which hologram is produced through interference of the two-dimensional useful signal and the two-dimensional reference signal. It may also contain means for reproducing the two-dimensional information being transmitted from the hologram by using an additional coherent light source wherefrom the coherent light flux travels to the recording unit.

If the necessity arises of amplifying the received two-dimensional useful signal and the received two-dimensional reference signal, it is expedient that the processing unit include a non-coherent light flux amplifier installed across the coherent light flux path, downstream of the unit for spatial matching of the two-dimensional useful signal and the two-dimensional reference signal.

In a system intended for transmitting two-dimensional information over long distances, when the approximation of the communication line by the "ground glass" transmission function is inapplicable, the unit for processing the two-dimensional useful signal and the two-dimensional reference signal may include, in successive arrangement along the path of the coherent light flux, a unit for spatial Fourier transformation of the signals, a unit for spatially directing said signals to the two-dimensional useful signal channel and the two-dimensional reference signal channel, respectively, a unit for recording an inverse Fourier hologram of the two-dimensional reference signal, the two-dimensional reference signal being applied thereto from the spatial separation unit, and a unit for recording a Fourier hologram of the two-dimensional useful signal, the two-dimensional useful signal being applied thereto from the spatial separation unit. There also may be an additional coherent light source, wherefrom the coherent light flux travels successively through both said recording units, wherein it is successively modulated by the Fourier holograms of the two-dimensional useful signal and the two-dimensional reference signal, respectively, after which the coherent light flux arrives at the unit for inverse Fourier transformation of the modulated light flux and at the unit for reproducing the two-dimensional information being transmitted from the Fourier hologram.

In order to maintain a flow of two-dimensional information between two or more subscribers, it is expedient that the system include at least one more subscriber station and a time synchronization unit which is common for all the units and which generates synchrosignals for subscriber stations, which synchrosignals are transmitted through the communication line on a separate light carrier. Each receiving means must comprise a selector receiving synchrosignals from the communication line and controlling the switching means in order to ensure time separation of operation of individual subscriber stations.

In order to maintain secrecy of two-dimensional information being transmitted and, in some cases, for additionally filtering out required information from the entire mass of information arriving at a given receiving means, it is expedient that the receiving means additionally include a coder arranged in the two-dimensional useful signal channel, which coder is constructed as a plate having a pre-selected phase distribution of the transmission or reflection coefficient and is arranged across the coherent light flux, downstream of the unit for optimum matching of the spatial spectrum of the two-dimensional reference signal with the two-dimensional operator of the transmission function of the communication line, and upstream of the unit for spatial matching of the two-dimensional reference signal and the two-dimensional useful signal. It is desirable that the receiving means additionally include a decoder arranged in the two-dimensional useful signal channel, being constructed as a plate whose phase distribution of the transmission or reflection coefficient is in complex cojugation with the transmission function of the coder.

In order to reduce losses of the two-dimensional reference signal and the two-dimensional useful signal as these are transmitted through the communication line, it is expedient that the latter be constructed as a light guide having mirror reflection internal walls to ensure propagation of the two-dimensional reference signal and the two-dimensional useful signal by way of multiple reflections from the light guide's walls, the light guide having cross-sectional dimensions that are substantially greater than the aperture of the two-dimensional useful signal directed into the light guide.

In order to minimize the effects of all kinds of destabilizing factors, such as medium parameters, vibration, etc., it is expedient that the light guide be made up of separate, coaxially arranged pipe lengths abutting against each other, having optically transparent flanged filled with an inert gas.

In order to make the distribution of the light energy and information over the light guide's cross-section as uniform as possible and thus make less stringent the requirements imposed upon the dynamic range of the hologram recording means, it is expedient that at least one plate be installed in the light guide, across the path of the two-dimensional useful signal and the two-dimensional reference signal, the phase transmission or reflection coefficient thereof being in pseudo-random variation across the aperture of the plate.

In order to reduce the effects of the parasitic background produced, in the course of receiving signals, by light fluxes re-reflected from the guide walls at angles greater than the estimated divergence angles of the coherent light flux which is spatially modulated by useful information with a preselected minimum resolution element, it is desirable that the internal surface of the light pipe have periodically spaced optically black portions.

In order to reduce signal losses in the light guide, especially in the case of a multiplex communication system involving a number of subscribers, it is expedient that each controlled unit for input and output of the two-dimensional reference signal and the two-dimensional useful signal to or from the communication line, respectively, be constructed as a semi-transparent mirror provided with a mechanism for changing the position of the mirror, said mechanism being connected to a selector, so that during operation of the respective subscriber station the mirror assumes its working position.

In order to service a mass of subscribers and reduce at the same time signal losses in the communication line due to the fact that the input-output unit removes energy during the period when the time channel of a given subscriber is out of action, it is expedient that each controlled unit for input and output of the two-dimensional reference signal and the two-dimensional useful signal to and from the communication line, respectively, be constructed as an optical deflector electrically connected to the selector. In this way, during operation of the respective subscriber station, the deflector directs the two-dimensional reference signal and the two-dimensional useful signal to the input of the switch of the respective station's receiving means.

The proposed system for transmitting two-dimensional information at optical frequencies in accordance with the proposed method for transmitting two-dimensional information makes it possible to transmit diverse information over long distances of hundreds of kilometers, economically and with the aid of generally accessible technical equipment. The proposed system features an exceptionally high traffic capacity which is greater than that of communication systems currently in operation or in the design stage by $10^4$ to $10^{12}$ times.

DESCRIPTION OF THE FIGURES

Other objects and advantages of the present invention will become more apparent from the following detailed description of preferred embodiments thereof to be read in conjunction with the accompanying drawings, wherein:

FIG. 5 is a block diagram of a system for transmitting two-dimensional information in accordance with the invention, which system has two subscriber stations and is also intended to realize the proposed method for transmitting two-dimensional information;

FIG. 12 is a block diagram of the processing unit of FIG. 2, intended for reproducing the image of a three-dimensional object in accordance with a transmitted two-dimensional hologram;

FIG. 13 is a block diagram of the processing unit of FIG. 3, intended to reproduce the image of a three-dimensional object in accordance with a transmitted two-dimensional hologram;

DISCUSSION OF THE PREFERRED EMBODIMENT

Figure 1:
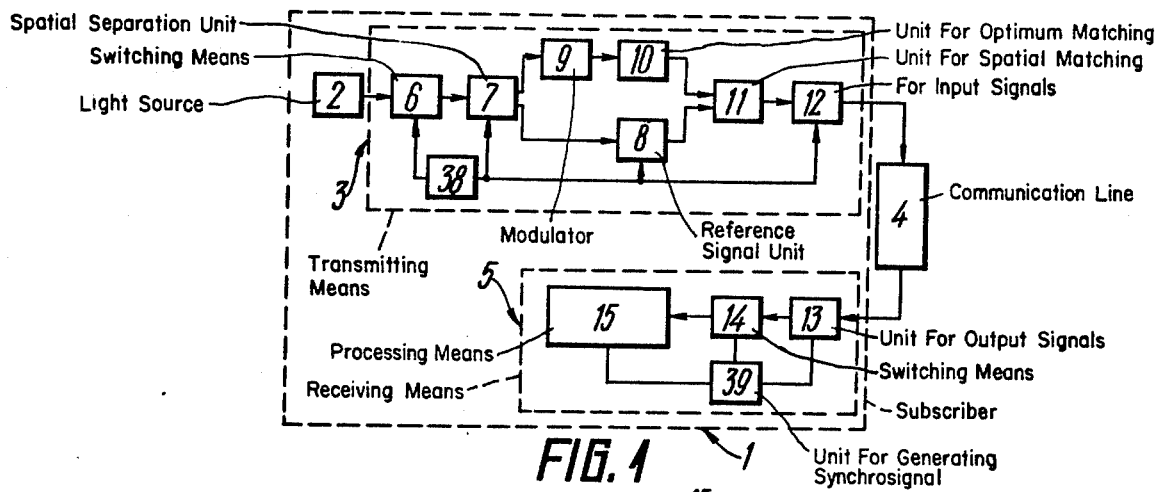
FIG. 1 is a block diagram of a system for transmitting two-dimensional information in accordance with the invention, which system is intended to realize the method for transmitting two-dimensional information of the present invention.

The proposed method for transmitting two-dimensional information about an object employs, in accordance with the invention, a two-dimensional useful signal formed in the course of two-dimensional spatial modulation of a coherent light source, and a two-dimensional reference signal displaced with respect to the two-dimensional useful signal, by a time interval which is not in excess of the time instability interval of the communication line through which said signals are successively transmitted. Combined processing of the received two-dimensional reference signal and the two-dimensional useful signal takes place at the output of the communicating line. Thus, there is effected compensation of identical distortions introduced by the communication line into the two-dimensional reference signal and the two-dimensional useful signal.

According to a first embodiment of the proposed method, the combined processing at the output of the communication line is effected by recording a hologram of the two-dimensional useful signal with respect to the two-dimensional reference signal by matching these signals in time and space, which hologram, when reproduced, makes it possible to obtain the undistorted two-dimensional information that has been transmitted. It is assumed that after passing through the communication line, the two-dimensional useful signal and the two-dimensional reference signal are represented by the following equations:

$$\overset{\circ}{a}(x,y) = a(x,y)e^{-j\varphi(x,y)}e^{jw(x,y)} \qquad (1)$$

$$\overset{\circ}{A}(x,y) = A(x,y)e^{-j\psi(x,y)}e^{jw(x,y)} \qquad (2)$$

where a (x, y) and A (x,y) are amplitudes of the two-dimensional useful signal and the two-dimensional reference signal; $\varphi(x,y)$ and $\Psi(x,y)$ are phase distributions of the two-dimensional useful signal and the two-dimensional reference signal; and $e^{jw(x,y)}$ is the transmission coefficient of the communication line as a distorting medium.

The intensity distribution over the hologram may then be represented as:

$$\varphi(x,y) = /a(x,y)e^{-jw(x,y)}e^{jw(x,y)} + A(x,y)e^{-jw(x,y)}e^{j}$$
$$w(x,y)/2 = |\mathring{a}(x,y)|^2 + |\mathring{A}(x,y)|^2 + \mathring{a}(x,y)\mathring{A}^*(x,y) + \mathring{a}^*(x,y)\mathring{A}(x,y) \quad (3)$$

which means that the presence of the distorting medium is compensated for in recording the hologram.

When reproduced, the hologram makes it possible to obtain the undistorted two-dimensional information that has been transmitted.

According to a second embodiment of the method of the present invention, said combined processing is carried out by recording a Fourier hologram of the two-dimensional useful signal and an inverse Fourier hologram of the two-dimensional reference signal in relation to an additional two-dimensional reference signal and by subsequently modulating an additional coherent light flux by said Fourier holograms, which is followed by inverse Fourier transformation of the modulated light flux. Thus, it becomes possible to reproduce the undistorted two-dimensional information that has been transmitted.

The second embodiment of the proposed method is based upon the approximation of the transmission function of the communication line by the following integral representation:

$$U(z,\eta) = \iint_\Omega u(x,y)L(x,y,z,\eta)dxdy \quad (4)$$

where $U(z,\eta)$ is the reponse of the communication line to the input signal $u(x,y,)$;

$(z,\eta)$ and $(x,y)$ are the coordinates in the output and input planes, respectively; and $L(x,y,z,\eta)$ is the function which characterizes the properties of the given communication line, otherwise known as "the communication line operator".

The integral is taken with respect to the input aperture $\Omega$.

The scales in the x, y, z and $\eta$ axes may be assumed to be equal. It may also be assumed that the apertures at the input and output of the communication line are equal, meaning that the cross-sectional dimensions of the apertures of the subscribers' signal input and output units are equal.

The compensation of distortions in the course of transmitting signals through a light guide is largely determined by the type of function $L(x, y, z, \eta)$.

If the light guide is square-shaped in section, it is clear that the "light guide operator" L may be represented as the function of linear combinations of the variables $(z + x)$, $(\eta + y)$.

In fact, in a light guide with a square-shaped cross-section, multiple re-reflections from its internal walls will produce a flare over the output section, which is equivalent to the illumination of the section by a number of light sources arranged in the input plane of the light guide, the positioning and phasing of these sources being determined by the number and nature of re-reflections of the light wave from the light guide walls. Indeed, a light beam is re-reflected in a similar manner in the kaleidoscope. This view of the light guide is generally accepted in the theory of superhigh-frequency waveguides. According to this theory, a wave propagating through a light guide is regarded as a sum of waves emitted by a number of discrete sources, as for example, Feiman, "Feiman's Lectures on Physics", vol. 6, Mir Publishers, Moscow, 1966.

It is clear that for a light guide having a squareshaped cross-section, theexpression (4) may be represented as follows:

$$U(z,\eta) = \iint_\Omega u(x,y)A(z - x, \eta - y)dxdy + \\ \iint_\Omega u(x,y)B(z - x, \eta + y)dxdy + \\ \iint_\Omega u(x,y)C(z + x, \eta + y)dxdy + \\ \iint_\Omega u(x + y)D(z + x, \eta - y)dxdy \quad (5)$$

where A, B, C, D are the components of the light guide operator corresponding to the type of the light guide's cross-section, there being four components for a light guide with a square-shaped cross-section.

Taking the Fourier transformation of the output illumination function $U(z,\eta)$ and taking into account the fact that the integrals in (5) are the convolutions of the function, we obtain:

$$F\{U(z,\eta)\} = F\{u(x,y)\}F\{A\} + F\{u(x-y)\}F\{B\} + \\ F\{u(-x,y)\}F\{C\} + F\{u(-x,y)\}F\{D\} \quad (6)$$

If the reference signal $U_o$ being transmitted through the light guide is a signal from a point source $U_o = \delta(x,y) = \delta(x = 0, y = 0)$, i.e. $F\{U_o\} = 1$, the corresponding output signal (the Fourier transformation thereof) will provide the required information on the parameters of the light guide between the given subscribers.

$$F\{U_o\} = F\{A\} + F\{B\} + F\{C\} + F\{D\} \quad (7)$$

In order to simplify the restoration of the useful signal, said signal may be transmitted in the form which is invariant with respect to reflection transformations (variations in the direction of X and y axes). For a light guide having a square-shaped cross-section this means transmitting four pictures instead of one, these pictures being arranged close to one another in four quadrants and forming the image $U_4$ which is symmetrical in relation to the x and y axes. Thus, $$F\{u_4(x, y)\} = F\{u_4(\pm x, \pm y)\} = F\{u\} \quad (8)$$

In order to restore the received image, it is necessary, as is inferred from equations 4 through 8, that the Fourier transformation of the received two-dimensional useful signal and two-dimensional reference signal be followed by dividing the Fourier response to the useful signal by the Fourier response to the reference signal, which, in turn, is followed by inverse Fourier transformation of the quotient.

In order to transmit two-dimensional color information, the two-dimensional reference signal and the two-dimensional useful signal are additionally formed on another two subcarrier frequencies. The number of the subcarrier frequencies may be increased, depending upon the required range of colors.

In the foregoing embodiments of the proposed method for transmitting two-dimensional information, the object whose image is transmitted may be two-dimensional transparencies, photographs, motion picture exposures, and controlled two-dimensional optical modulators recording an image to be transmitted, which image is produced by illuminating real objects.

at said recording unit 26 from the unit 24. The recording of the Fourier hologram of the two-dimensional useful signal in the unit 26 and the recording of the inverse Fourier hologram of the two-dimensional reference signal in the unit 25 are carried out with respect to an additional reference signal arriving from an additional coherent light source 27, wherefrom the coherent light flux travels successively through the units 26 and 25, wherein it is successively modulated by the Fourier holograms of the two-dimensional useful signal and the two-dimensional reference signal, they being, respectively, a direct hologram and an inverse hologram. Thereafter the coherent light flux arrives at a unit 28 for inverse Fourier transformation of the light flux modulated by the units 26 and 25, until it finally reaches a unit 29 for reproducing the information being transmitted from the Fourier hologram.

Figure 4:
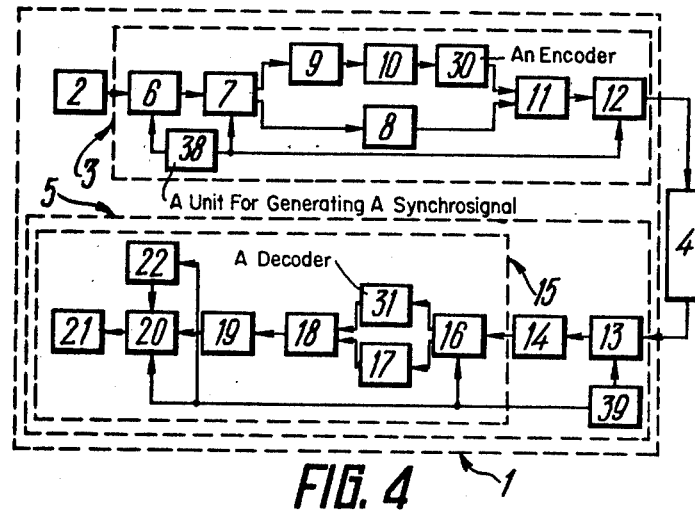
FIG. 4 is a block diagram of the system of FIG. 1, which system is provided with a coder and decoder.

If the necessity arises for keeping secret the information being transmitted, the transmission means 3 in FIG. 4 additionally includes a coder 30 installed in the two-dimensional useful signal channel, which coder 30 is made as a plate with predetermined phase distribution of the transmission or reflection coefficient and is located downstream of the unit 10 for optimum matching of the spatial spectrum of the two-dimensional useful signal with the two-dimensional operator of the transmission function of the communication line 4, and upstream of the unit 11 for spatial superposition of the two-dimensional reference signal and the two-dimensional useful signal. The receiving means 5 additionally includes a decoder 31 installed in the two-dimensional useful signal channel, the decoder 31 being made as a plate with phase distribution of the transmission or reflection coefficient and being in complex conjugation with the transmission function of the coder 30.

Traffic of two-dimensional information among a great number of subscribers is effected through time separation of channels, each subscriber being allotted a preselected time interval during which transmission is to be carried out. To ensure two-dimensional information traffic between two subscribers, the system of FIG. 4 has one more subscriber station 32 in FIG. 5 and a time synchronization unit 33 which is common for the subscriber stations 1 and 32 and generates synchrosignals for the subscriber stations 1 and 32, which synchrosignals are directed to a communication line 34 by a synchrosignal input unit 35 and transmitted through the communication line 34 on a separate light carrier.

The difference between the light carrier, on which synchrosignals are transmitted, and the light carrier of the useful signal and the reference signal makes it possible to filter out synchrosignals in the course of reception. Synchrosignals are a periodic sequence of light pulses which form code combinations of channel numbers and include periodically repeated clock pulses.

With a duration of the transmission of the two-dimensional useful signal and the two-dimensional reference signal being equal to $2\tau$, the time interval between neighboring synchrosignals may amount to $(30 + 100) \times 2\tau$. The required information gating time is set within this time interval in the receiving means 5, after the coded synchrosignal corresponding to a required number is associated with the clock pulse.

The synchrosignal discrimination means in each receiving means 5 of the subscriber stations 1 and 32 comprises a selector 36. From the communication line 34 synchrosignals are directed to the selector 36 by means of a synchrosignal output unit 37. The selector 36 decodes the code sequences of synchrosignals and forms control signals for the unit 7 for spatial separation of the two-dimensional reference signal and the two-dimensional useful signal, and the unit 8 for forming the reference signal. These control signals are also intended to actuate the input unit 12 and the output unit 13, as well as for the switching means 14 and 6 of the receiving means 5 and the transmitting means 3, respectively, to ensure time separation of operation of the respective subscriber stations 1 and 32, and, finally, for the processing unit 15.

In order to ensure two-dimensional information traffic among a great number of subscribers, the system of FIG. 5 includes a required number of subscriber stations, the number of these stations corresponding to that of subscribers. In this case the time synchronization unit generates synchrosignals for all the subscriber stations.

In the system of FIG. 1, synchrosignals for the transmitting means 3 are generated in a unit 38 and are sent to the switching means 6 for forming a useful pulse signal and a reference pulse signal, to the unit 7 for directing the signals to the two-dimensional reference signal channel and the two-dimensional useful signal channel, and to the unit 12 for directing signals into the communication line 4. Synchrosignals for the receiving means 5 are generated by a unit 39 and are sent to the processing unit 15 and the signal output unit 13.

Figure 2:
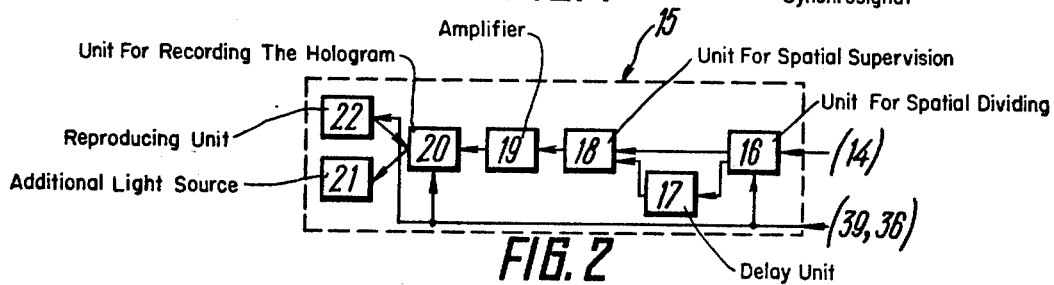
FIG. 2 is a block diagram of a unit for processing a two-dimensional reference signal and a two-dimensional useful signal, which unit is incorporrated in the proposed system.

In the processing unit 15 of FIG. 2, synchrosignals from the unit 39 or 36 are applied to the additional coherent light source 22, the hologram recording unit 20, and the unit 16 for directing signals to the two-dimensional reference signal channel and the two-dimensional useful signal channel.

The function of the communication line 4 and 34 in the system of FIGS. 1, 4 and 5 may be performed by a free space, including a turbulent atmosphere, or by a light guide provided with a number of beam-guiding lenses.

Figure 3:
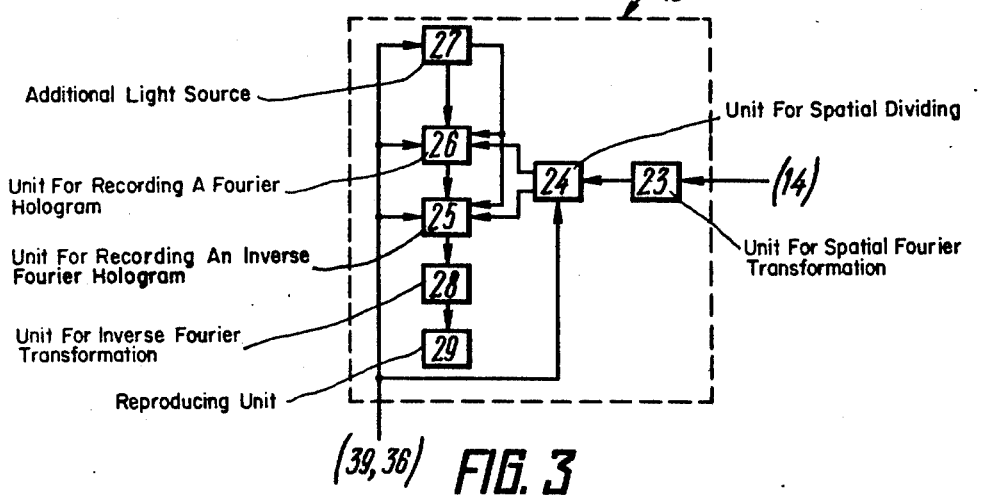
FIG. 3 is a block diagram of another embodiment of the unit for processing the two-dimensional reference signal and the two-dimensional useful signal.

In the processing unit 15 of FIG. 3, synchrosignals are applied from the unit 39 or 36 to the additional light source 27, the Fourier hologram recording units 25 and 26, and the unit 24 for directing signals to the two-dimensional reference signal channel and the two-dimensional useful signal channel.

Figure 6:
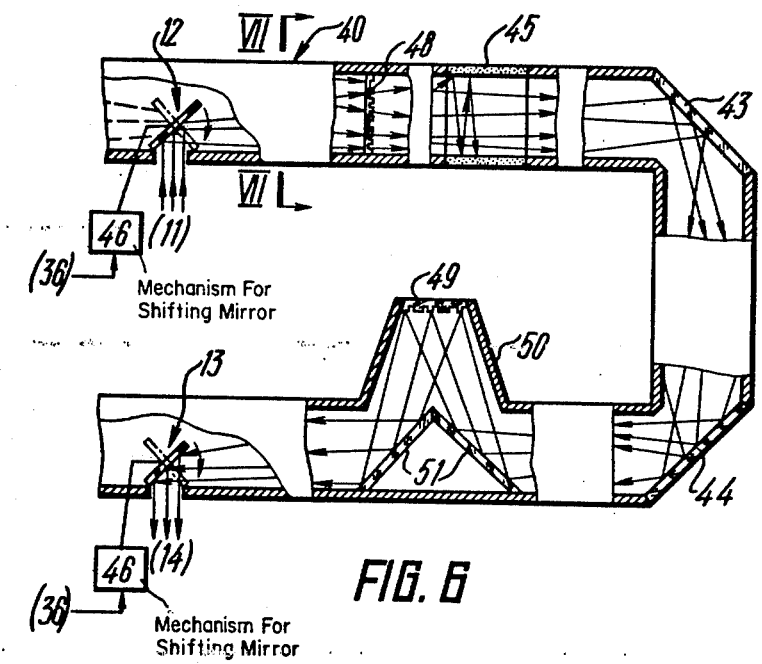
FIG. 6 is a general, cut-away view of a multimode light guide of the system in accordance with the invention.

However, to transmit two-dimensional information over long distances, when great losses due to energy dispersion are impermissible, it is preferable that the proposed system employ a communication line 40 in FIG. 6 constructed as a multimode light guide, also referred to as light guide 40, having mirror reflection internal walls which ensure propagation of the two-dimensional reference signal and the two-dimensional useful signal by way of multiple reflections thereof from the internal walls of the light guide 40.

The cross-sectional dimensions of the light guide 40 are considerably greater than the aperture of the two-dimensional useful signal directed to said light guide 40. The light guide 40 in FIG. 7 has a square-shaped cross-section. On the other hand, light guides 41 in FIG. 8 and 42 in FIG. 9 have a round and a triangular cross-section, respectively. The selection of a cross-sectional shape of the light guide correspondingly always alters the parameters of the unit 10 in FIGS. 1, 4 and 5 for optimum matching of the spatial spectrum of the two-dimensional useful signal with the two-dimensional operator of the transmission function of the light guide 40.

The light guide 40 in FIG. 6 has a complex configuration, its bends being made at different angles. In the bends there are installed mirrors 43 and 44 which make it possible to maintain small re-reflection angles of the two-dimensional reference signal and the two-dimensional useful signal from the walls of the light guide 40.

In order to eliminate the effects of interfering light beams reflected from the internal walls of the light guide 40 at angles which are in excess of the preselected divergence angle, the internal surface of the light guide 40 has evenly spaced black portions 45, the cross-sectional dimensions of these portions being no less than those of the light guide 40, the length of these portions being equal to the diameter of the light guide 40 divided by the sine of the beam divergence angle.

Each controlled input unit 12 and output unit 13 for directing the two-dimensional useful signal and the two-dimensional reference signal into the light guide 40 and out of it employed in the system of FIG. 5, is made as a semi-transparent mirror which directs the useful signal and the reference signal in one or both directions along the light guide 40. To minimize the interference of the subscribers with one another, the cross-sectional dimensions of the mirror must be much less than the cross-sectional dimensions of the light guide. The selector 36 is electrically connected to a mechanism 46 of a generally known design. The selector 36 sends signals to the mechanism 46 intended for shifting said mirror. In order to exclude losses in the signals propagating along the light guide 40, when the given subscriber station 1 in FIG. 5 or 32 is not operating, the mechanism 46 shifts the mirror to a nonoperating position. During operation of the respective subscriber station 1 or 32, this mechanism shifts said mirror to its working position.

Figure 10:
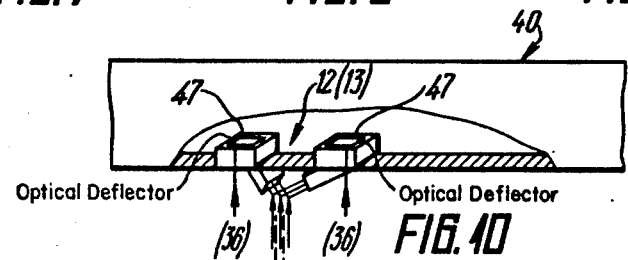
FIG. 10 is a general, cut-away view of a unit for directing the two-dimensional reference signal and the two-dimensional useful signal into and out of the light guide, which unit is installed in the light guide.

In another embodiment of the system, each controlled input unit 12 in FIG. 10 and output unit 13 is constructed as an optical deflector actuated by signals from the selector 36 electrically coupled thereto, so that during operation of the respective subscriber station 1 or 32 in FIG. 5 it reflects the two-dimensional reference signal and the two-dimensional useful signal, directing them to the input of the switching means 14 of the receiving means 5 of the given subscriber station. In FIG. 10, this position of the deflector is shown by the dotted line.

Installed in the light guide 40 in FIG. 6, between the units 12 and 13, are plates 48 and 49 whose phase transmission or reflection coefficient is in pseudo-random variation across the plate aperture, which is meant to reduce the effects of regular non-uniformities of the light guide 40 and to ensure retrieval of the two-dimensional information being transmitted from any portion of the aperture of the light guide 40. The number of these plates is determined by the specific embodiment of the light guide.

These plates are intended either for letting the light flux pass therethrough or to reflect the light flux. In the former case they are optically transparent, as is the plate 48 and in the latter case they are made as mirrors, as the plate 49.

When the reflecting plate 49 has to be installed in a straight-line portion of the light guide 40, a bend 50 is made in said light guide, in which bend the plate 49 is arranged. The light flux is directed from the light guide 40 into the bend 50 with the aid of a system of mirrors 51.

Figure 11:
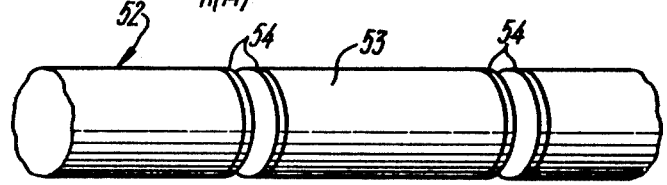
FIG. 11 is a general view of a multimode light guide constructed from sealed, coaxially arranged pipe lengths.

In order to reduce the effects of the surrounding medium, including such factors as thermal and mechanical deformations, upon the transmission quality, a light guide 52 in FIG. 11 is constructed from sealed pipe lengths 53, these pipe lengths being arranged coaxially and abutting against each other, but with no mechanical contact therebetween. These pipe lengths 53 are provided with transparent flanges 54 filled with an inert gas, for example argon. All the other components of the light guide 40 may be employed with equal success in the light guide 52.

In order to transmit an image of a three-dimensional object by means of a two-dimensional hologram through the communications lines 4 in FIG. 1, 34 in FIG. 5 and 40 in FIG. 6, the processing unit 15 of FIG. 2 additionally includes a unit 55 in FIG. 12 for recording a two-dimensional hologram of said three-dimensional object relative to an additional reference signal arriving from the source 22. In addition, arriving at the unit 55 are synchrosignals from the unit 39 and a modulated coherent light flux from the recording unit 20. Restoration of the image being transmitted is done in the unit 21, applied whereto is a signal from the unit 55.

For the same purpose, the processing unit 15 of FIG. 3 additionally includes a unit 56 in FIG. 13 for recording a two-dimensional hologram of the three-dimensional object in relation to an additional reference signal arriving from the source 27. Also applied to the unit 56 are synchrosignals from the unit 39 and a modulated coherent light flux from the unit 28. The restoration of the image being transmitted is effected in the unit 29, applied whereto is a signal from the unit 56.

Figure 14:
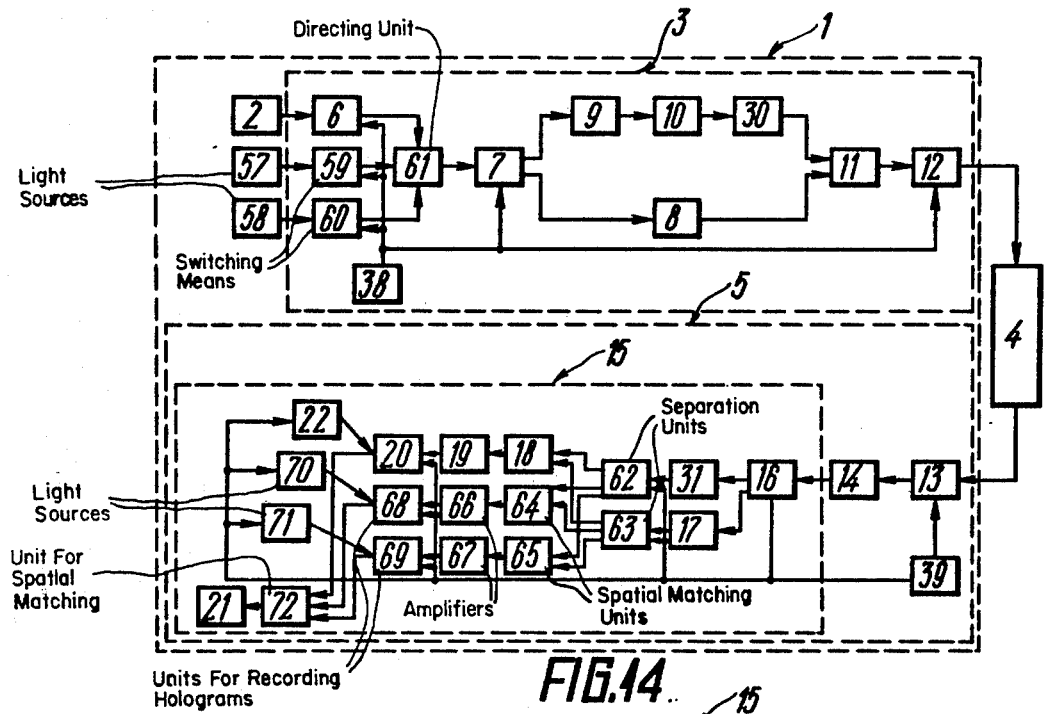
FIG. 14 is a block diagram of the system of FIG. 1, intended for transmitting two-dimensional color information.

In order to transmit two-dimensional color images, the system of FIG. 4 additionally includes two coherent light sources 57 and 58 in FIG. 14 from which the light flux is sent, on different color subcarrier frequencies, to switching means 59 and 60. Two-dimensional useful and reference signals formed on three subcarrier frequencies are applied to a unit 61 for matching these signals into one optical channel and are then sent along the path of the coherent light flux to the unit 7 for directing the two-dimensional reference signal and the two-dimensional useful signal to the two-dimensional reference signal channel and the two-dimensional useful signal channel, respectively.

In this case the processing unit 15 additionally includes units 62 and 63 for separation of the two-dimensional reference and userul signals into three channels, each channel being intended for one color subcarrier frequency. This accounts for the inclusion of additional units 64 and 65 for spatially matching the two-dimensional reference signal and the two-dimensional useful signal, non-coherent amplifiers 66 and 67 intended to amplify the interference pattern, and units 68 and 69 for recording holograms of useful signals with respect to reference signals. Also included in the processing unit 15 are additional coherent light sources 70 and 71 employing different color subcarrier frequencies corresppnding to the subcarrier frequencies of the coherent light sources 57 and 58, respectively, and a unit 72 for matching the restored images on three color subcarrier frequencies.

One of the alternative embodiments of the system of FIG. 4 employs a communication line constructed as the light guide 40 of FIG. 6. The optical circuit of this system is represented in FIG. 15.

Figure 15:
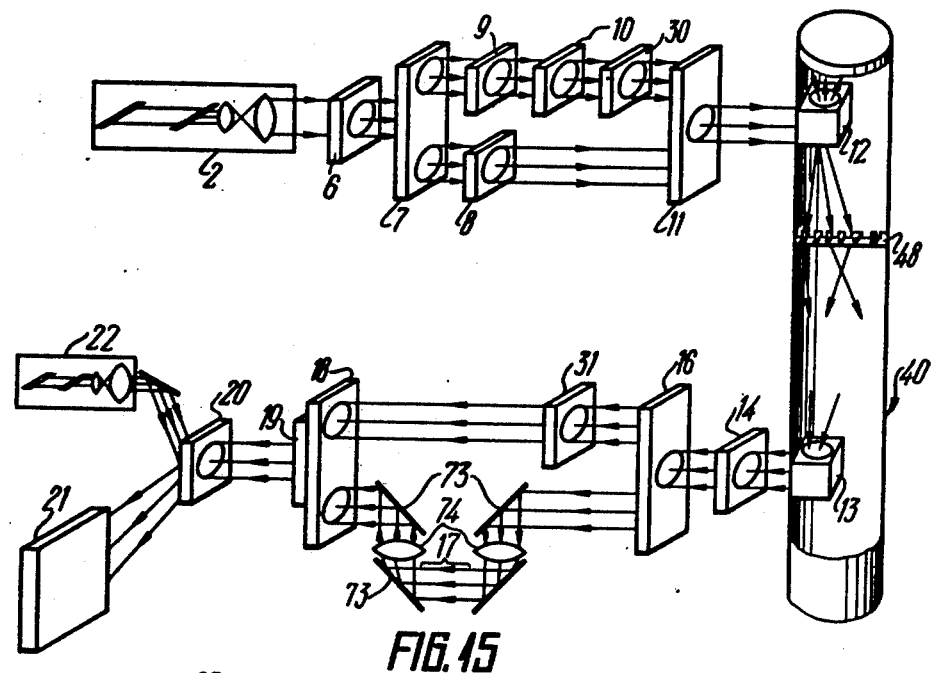
FIG. 15 is an optical circuit of the system of FIG. 1, which system includes the unit for processing the two-dimensional reference signal and the two-dimensional useful signal of FIG. 2, a coder and decoder, both with predetermined phase distribution of the transmission coefficient, and the light guide of FIG. 6.

Referring to FIG. 15, the coherent light source 2 is constructed as a pulsing laser (Controlled by synchrosignals) provided with a telescopic device to ensure required cross-sectional dimensions of the light beam.

The source 2 may also be a continuous laser, for example, a helium-neon laser.

The switching means 6, which is intended for time modulation of the laser emission to form, in accordance with synchropulses, a reference signal light puse and a useful signal light pulse, is constructed as a Kerr cell; it may also be constructed as an electrooptical modulator based on the Pockels effect and employing KDP or ADP crystals or other electrooptical materials which ensure a sufficiently fast response.

The unit 7, which directs the reference signal light pulse and the useful signal light pulse to physically different channels, is constructed as an electrooptical deflector having one input and two outputs, which deflector makes use of conventional electrooptical crystals for light beam deflection. Although the deflector may also be built around an ultrasonic cell, this alternative affects the speed of response.

The modulator 9 which forms a useful signal from a light pulse is constructed as a device for transillumination of films and slides. It may also be constructed as an electrooptical modulator matrix, an electrically controlled transparency, a multichannel ultrasonic light modulator, or a modulator based upon conventional means of the eidophore type with an oil or plastic metallized film whose deformation modulates the light flux.

The unit 10 is constructed as a system of mirrors or prisms. For example, if the communication line is a rectangle-shaped pipe, the system quadruples the image being transmitted to make it correspond to the symmetrical or even spectrum. If the guide is a round pipe, the unit may comprise cone-shaped mirror surfaces or cone-shaped lenses.

The coder 30 is made as described above, i.e. as a plate from a transparent material, which plate has a variable optical and physical sectional thickness, which changes in both coordinates in accordance with the pseudo-random law, the minimum thickness variation pitch being equal to or in excess of the resolution element of the image being transmitted, that in the section of the beam passing through the coder 30. The unit 8 in the two-dimensional reference signal channel is similar to the unit 10 in the two-dimensional useful signal channel. It may also be constructed as a transparency with preselected distribution of the amplitude-phase transmission coefficient, for example, as a spherical lens and a diaphragm arranged at the focal point of said lens, across the path of the coherent light flux, to form a two-dimensional reference signal having a spherical phase front.

The matching unit 11 is constructed as a system of mirrors directing the two-dimensional useful signal and the two-dimensional reference signal into one optical channel. Prisms may be employed instead of mirrors.

The function of the controlled unit 12 for signal input into the communication line 40, which line in the present example is a light guide, is performed, as it has been described above, by a mechanically controlled, turnable semitransparent mirror. When in operation, this mirror is set with the aid of the mirror shifting mechanism (not shown) in a position at which light pulses are sent in the direction of the unit 13 of the receiving means, along the axis of the light guide 40. In the idle or non-operating position, the mirror plane is parallel to the axis of the light guide 40. The controlled input unit may also be constructed as an optical deflector.

The communication line 40 is constructed as a multimode light guide, that is, a pipe with polished internal walls. The function of the communication line may also be performed by a free space, by a light guide having beam-guiding lenses, or by a light guide having beam-guiding mirrors.

Randomization of signals in the light guide 40 is performed with the aid of the plate 48 made from a transparent material and having a sectional optical thickness which varies in accordance with the pseudo-random law. This plate is similar to the above-mentioned coder 30.

The output unit 13 does not differ in principle from the above-mentioned input unit 12 and may be constructed from the above-indicated components, that is, electromechanically controlled semitransparent mirrors or optical deflectors.

The switching means 14 intended for gating a reference signal and a useful signal pair for a given subscriber, is identical with the switching means 6 in the transmitting means, although some changes may be introduced into it, due to the fact that the received signal is much weaker than the transmitted signal, which makes less stringent the requirements imposed upon the components of the switching means, that is, the electrooptical crystals.

In the present optical system the processing unit 15 is constructed in accordance with FIG. 2.

The spatial separation unit 16 is a controlled deflector and may be identical with the unit 7 that has been described above.

The decoder 31 is identical with the coder 30, although the former differs from the latter in that the variation in its sectional optical thickness is in complex conjugation with the variation in the optical thickness of the coder 30, which means that an increase in the optical thickness of the coder 30 corresponds to a decrease in the optical thickness of the decoder 31.

The delay unit 17, for example a delay line, is constructed as a plurality of mirrors 73 which re-reflect without distortions the light beam through a distance, that is, the optical path length, from input to output corresponding to a required signal delay. The delay line includes spherical lenses 74 for phase front correction, the focal distance of these lenses corresponding to the length of the optical path of the signal through the delay line so as to prevent the sectional light distribution at the input and output of the line from being identical. Reflecting prisms may be used instead of mirrors.

The spatial matching unit 18 is constructed as a system of mirrors or prisms and is similar to the unit 11. However, the unit 18 differs from the unit 11 in that in the unit 18, the optical elements are arranged so that the reference signal and the useful signal reach the output section of the unit from different angular directions, as is the case with recording holograms with a reference wave.

The non-coherent light amplifier 19 is constructed as an image converter whose photocathode is arranged in the output plase of the spatial matching unit 18.

The recording unit 20 is constructed as a conventional device having a photoconductive layer subjected to radiation, and a ferroelectric layer which is in contact with the photo-conductive layer and which alters the scattering coefficient of the light that reaches the surface of the ferroelectric material, depending upon voltage distribution. The recording unit may also be based upon conventional photochrome materials which change their absorption spectrum when subjected to radiation, upon elastomer materials deformed under the action of an electric field, or upon liquid crystals.

The additional coherent light source 22 is constructed as a pulsing laser provided with a telescopic device to ensure a required cross-sectional size of the beam. It may also be constructed as the source 2, i.e. as a continuous laser.

The reproduction unit 21 is constructed as a photo-recording device, for example, a photographic or movie camera, or as a screen provided with an optical system for visual observation.

Figure 16:
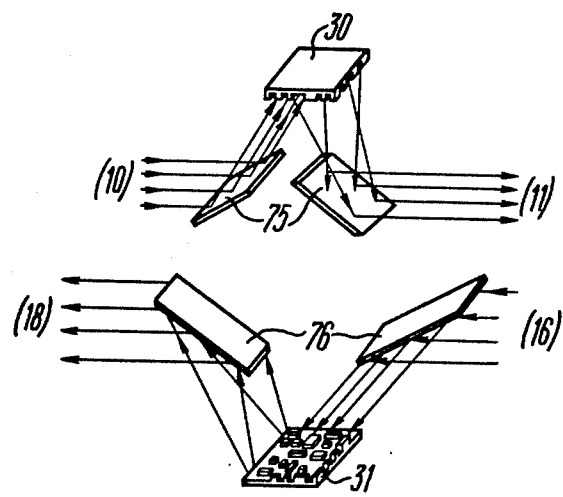
FIG. 16 is an optical circuit of the coder and decoder with predetermined phase distribution of the transmission coefficient, which coder and decoder are incorporated in the system of FIG. 15.

In the embodiment represented in FIG. 16, the coder 30 and the decoder 31 are made as a mirror plate, for example, metal or metallized, with the light beam being directed thereat through additional mirrors 75 and 76, respectively. The plate has a light-reflecting surface made according to the pseudo-random law, in compliance with the requirements imposed upon the resultant width of the space spectrum of the signal after it passes through the coder 30.

Figure 17:
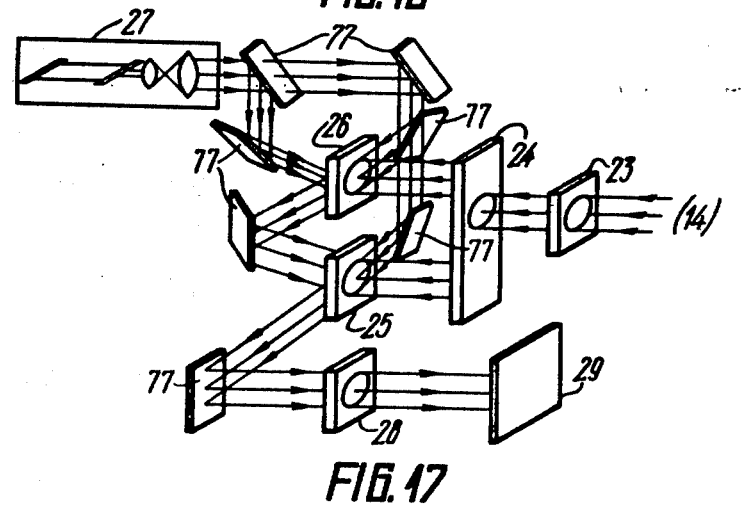
FIG. 17 shows an optical circuit of the unit for processing the two-dimensional reference signal and the two-dimensional useful signal of FIG. 3.

In the embodiment of FIG. 17, the processing unit 15 includes the spatial transformation unit 23 constructed as an objective for two-dimensional Fourier transformation of signals, the spatial separation unit 24 which is the above-indicated controlled deflector, the units 25 and 26 for recording Fourier holograms, which units are identical with the above-mentioned hologram recording unit, with the only difference being that the recording conditions in one of the units provide for inverse recording of the signal spectrum, the additional coherent light source 27 identical to the one described above, the inverse transformation unit 28 similar to the unit 23, and a number of mirrors or prisms 77 for directing light beams into required channels between the units. The unit 29 of FIG. 17 is similar to the above-indicated unit 21.

The optical circuit of the system for transmitting three-dimensional and color images is similar to the circuit that has been described above, with the exception of the additional elements according to FIGS. 12, 13 and 14.

All the foregoing optical elements are widely known and have been described in technical literature, see for example, Radiotechnika za rubezhom (Radioengineering Abroad), No 1/739/, Moscow, 1974.

The operating principle of the system for transmitting two-dimensional information at optical frequencies in accordance with the present invention is as follows.

From the coherent light source 2 in FIG. 1, the coherent light flux arrives at the switching means of the transmitting means, wherein two two-dimensional light pulse units are formed at a preselected clock frequency, which light pulse units correspond to the two-dimensional reference signal and the two-dimensional useful signal. Said light pulse units are formed by way of amplitude modulation of the light flux emitted by the source 2, the duration of each light pulse unit being normally equal to or in excess of the time dispersion interval of the signal, as the signal passes through the communication line 4 between the subscribers. The interval between the light pulse units must not be in excess of the characteristic time of instability of the parameters of the communication line 4, as shown in an example below. The light pulse unit of the reference signal may consist of a number of successive pulses. The pulse units, which are amplitude-modulated two-dimensional light pulses, having preselected amplitude-phase distribution over the cross-section of the light flux, arrive at the spatial separation unit 7 which directs said pulse units, in accordance with control signals or synchrosignals that are common for the transmission means 3, to two channels physically separated in space, i.e. the two-dimensional reference signal channel and the two-dimensional useful signal channel. The unit 7 can simultaneously form preselected sections of light pulses.

The two-dimensional light pulse (pulse unit) travelling through the two-dimensional reference signal channel is spatially modulated in amplitude and phase in the unit 8, in order to produce the required two-dimensional (for example spherical) phase distribution over the light flux section. If the reference signal consists of a number of pulses, there may be different amplitude-phase distribution in each pulse.

The two-dimensional light pulse (pulse unit) travelling through the two-dimensional useful signal channel passes successively through the modulator 9, where the amplitude and phase over the flux section are modulated by the useful signal, and then through the unit 10 for optimum matching of the useful signal with the operator of the communication line 4, where additional spatial amplitude-phase modulation of the two-dimensional pulse unit takes place, for example, transformation of the useful signal so as to make the space spectrum thereof symmetrical.

The two-dimensional light pulses, that have passed through the two-dimensional reference signal channel and the two-dimensional useful signal channel, are applied to separate inputs of the spatial matching unit 11, wherefrom they are directed into one optical channel, wherein these pulses travel successively one after the other.

From the output of the unit 11 the two-dimensional useful signal and the two-dimensional reference signal are applied to the controlled input unit 12 for directing the signals into the communication line 4. The input line 12 is controlled by synchrosignals which set in advance into the working position all the controllable components of this unit and set working conditions which ensure forwarding of the two-dimensional useful signal and the two-dimensional reference signal applied to the input of the unit 12 along the axis of the communication line 4, in the direction of the receiving means at the subscriber's end of the line. After the passage of the signals through the input unit 12, the controllable components of this unit return back to the idle or non-operating position, which is aimed at minimizing interference in the course of signal propagation along the communication line 4.

Thus, a single information transmission cycle includes the time during which light travels through the units of the transmitting means 3 and the time, which normally is substantially longer, for setting the controllable components of the input unit 12 into the working position and switching them over to the idle or non-operating position.

The reference signal and the useful signal travel along the communication line 4 in the direction of the subscriber. In doing so, they are subjected to transformations typical of the given type of line and the way it is constructed, for example, attenuation, spatial modulation distortions, space spectrum distortions, dispersion with time.

To receive the signals, synchrosignals set the working position of the controllable components of the output unit 13 in advance so that by the time of arrival thereat of light pulses of the reference signal and the useful signal, it would be possible to direct part of the light flux from the communication line 4 to the receiving means 5.

The pulses of the reference signal and the useful signal that are directed from the communication line 4 by the output unit 13, arrive at the switching means 14 which discriminates or gates in time the reference signal and the useful signal sent by the transmitting means 3 and intended for the addressee. The discriminated two-dimensional light signals are applied to the unit 15 for processing said signals, which unit 15 compensates the distortions introduced by the communication line 4 into the information being transmitted by means of combined processing of the two-dimensional reference signal and the two-dimensional useful signal.

In the processing unit 15 illustrated in FIG. 2, the received two-dimensional reference signal and the received two-dimensional useful signal are directed into different channels, which operation is carried out by the spatial separation unit 16. Then, one of these signals, depending upon their sequence, is applied to the input of the delay unit 17. Phase correction of the wave front follows, which is necessary to determine the extra distance covered by the light signal in the delay unit 17.

The two-dimensional reference signal and the two-dimensional useful signal, that have been modulated in time, are applied to the inputs of the spatial matching unit 18, where the two light beams, each corresponding to the useful signal and the reference signal, respectively, are directed to one area in space so as to produce at the output of the unit 18, in a certain cross-sectional area, an interference pattern, i.e. a hologram, of the received two-dimensional useful signal with respect to the received two-dimensional reference signal. The interference pattern (amplitude distribution) produced at the input of the non-coherent light amplifier 19 matched with the output of the unit 18 is recorded, after amplification, in the hologram recording unit 20. At the required moments of time, which correspond to the moments when the received information has to be reproduced, the hologram recorded in the unit 20 is illuminated by the additional coherent light source 22, and the image reproduced by means of illuminating the hologram is recorded in the reproduction unit 21. The units 22, 20, 19 and 16 are controlled by respective synchrosignals applied thereto.

In the processing unit 15 of FIG. 3, the two-dimensional useful signal and the two-dimensional reference signal, that have been received and discriminated from other pulse signals, are applied to the unit 23 which is intended for spatial Fourier transformation of signals passing therethrough. The Fourier-transformed useful and reference signals are applied from the output of the unit 23 to the unit 24 which directs, in accordance with control signals or synchrosignals, the Fourier-transformed reference and useful signals to two physically different spatial channels.

The separated two-dimensional reference signal and the two-dimensional useful signal (the spectra thereof) are recorded on separate operational carriers in the units 25 and 26, the recording of the two-dimensional reference signal being carried out with inversion in order to make it possible to divide the useful signal spectrum by the spectrum of the two-dimensional reference signal. The recording is done at the moment of arrival of the reference signal and the useful signal, by using part of the coherent light flux omitted by the additional light source 27.

The recorded Fourier holograms of the reference signal and the useful signal received within a given time interval are transilluminated by the coherent light flux from the additional source 27, and the resultant light flux is directed to the unit 28 intended for reproducing the received signal. Information readout from the recorded Fourier holograms may be carried out within the time interval between the end of hologram recording and the beginning of preparing the units 25 and 26 for receiving the following useful signal (during the following operational cycles).

The proposed system of FIG. 4, which makes use of the coder 30 and the decoder 31 in order to maintain the secrecy of transmission, is characterized by the following:

in the course of transmission, an additional light flux, obtained after the light pulse has been modulated by the useful signal, passes through the coder 30 and on through the above-indicated units, in accordance with the above-indicated sequence of operation of said units;

in the course of reception, after the reference signal and the useful signal have been directed to physcially separated spatial channels, the discriminated useful signal is additionally passed through the decoder 31 and then passes through the above-indicated units, in accordance with the above-mentioned operating sequence of said units.

In maintaining the multiplex communication between two or more subscribers, in accordance with FIG. 5, the operation of the means 3 and 5 per se is as described above. The subscribers' equipment, which in this case includes the output unit 37 and the selector 36, is controlled in accordance with clock code pulses sent by the time synchronization unit 33. The operational sequence in this case is as follows. Synchrosignals generated in the unit 33 modulate in that unit the carrier light frequency and are continuously applied via the synchrosignal input unit 35 to the communication line 34. The unit 37 for synchrosignal output from the communication line 34 continuously takes from the communication line 34, in the course of operation of the subscriber station 1, part of the energy of the signals transmitted through the communication line at the frequency which is selected for transmitting synchrosignals. The selector 36 decodes the signals applied thereto from the unit 35 and forms control signals to actuate, that is, to switch on and off at required moments of time, all the electrically controlled units of the transmitting means 3 and the receiving means 5 of the subscriber station 32. The selection of the required communication time channel and of the direction of the reception and transmission of signals is carried out by setting respective code combinations in the decoding circuit of the selector 36.

When the function of the communication line is performed by the multimode light guide 40 in FIG. 6, the two-dimensional useful signal and the two-dimensional reference signal are directed into the light guide parallel to the optical axis thereof. The inut unit 12 and its working member, i.e. the semitransparent mirror, are set in advance, i.e. prior to the application of the reference and useful signals, into the working position with the aid of the mechanism 46, the dotted line in FIG. 6 indicating the working position of the mirror for changing in a required direction the signal transmission or reception. Similarly, the mirror of the output unit 13 is set in the working position in advance, i.e. prior to the arrival of the signals at the subscriber station.

In the course of propagation of the useful signal and the reference signal in the direction of the axis of the light guide 40, these signals are multiply re-reflected from the reflecting internal walls of said light guide. If the condition is met, whereby the minimum resolution element in the signals being transmitted amounts, in the cross-section, to 30 to 100 wavelengths of the light wave, the re-reflections produce a small-angle incidence of only a few degrees, of waves onto the walls of the light guide 40. Naturally, in this case the light beams lose very little energy in the course of reflection, even if the internal walls of the light guide have no special coating.

Multiple re-reflections in the light guide may lead, keeping in mind the unavoidable imperfections in the finish of the light guide's internal surface, to undesirable concentration of the light flux at one of the light guide's walls. Taking into consideration the probability of this phenomenon, provision is made for plates 48 or 49 installed in the light guide. The plates 48 feature pseudo-random transmission coefficient distribution, whereas the plates 49 display a similar reflection coefficient. When passing through said plates, the light flux expands again so that it covers the entire cross-sectional area of the light guide 40. Signals which, due to some or other reason, feature great incidence angles of more than a few degrees, are greatly dispersed with time and may produce an undesirable background in the course of signal reception. These rays are eliminated as the light passes through the optically black portions 45 of the light guide 40. At the sharp bends of the light guide 40 the light is reflected from the mirrors 43, 44 and 51, which ensure the light flux path along the axis of the light guide 40.

In the case of the light guide 52 in FIG. 11 which is constructed from the separate sealed pipe lengths 53 provided with the flanges 54, the light flux travels through the light guide in the manner described above. The joints of the separate pipe lengths 53 account for a slight energy attenuation.

Figure 7:
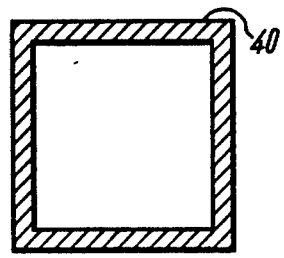
FIG. 7 is a sectional view of the light guide taken along the line VII—VII of FIG. 6.
Figure 8:
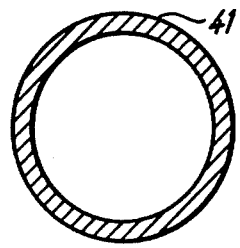
FIG. 8 is a sectional view of another embodiment of the light guide.
Figure 9:
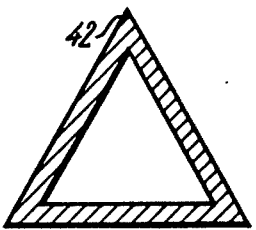
FIG. 9 is a sectional view of still another alternative embodiment of the light guide.

The selection of the light guides 40 in FIG. 7, 41 in FIG. 8 and 42 in FIG. 9 having different cross-sectional shapes has no effect upon the propagation of light pulses along the light guide and the operation of the above-mentioned light guide components.

If the function of the input unit 12 and the output unit 13 is performed by the optical deflectors of FIG. 10, the selectors 36 bring the optical medium of the deflectors in advance, i.e. prior to the arrival of the useful signal and the reference signal, to a state which ensures a deflection at a certain angle of the light flux that arrives at the input aperture of these deflectors, said angle being sufficient for input or output of signals to or from the light guide 40, respectively. In the idle or non-operating position, the portion of the deflector which is inside the light guide 40 ensures passage of the light flux propagating along the light guide 40 with small losses and distortions of the phase front, as the light flux passes past a given subscriber station.

In the case of transmitting three-dimensional images, the object of the transmission is a two-dimensional hologram of the three-dimensional object being transmitted. In order to reproduce the image of the object in FIGS. 12 and 13, the received hologram is recorded in the recording unit 55 or 56, respectively, and then is illuminated by the coherent light flux from the additional source 22 or 27, respectively, to make possible observation of the three-dimensional image.

The reproduction of a three-dimensional image of an object may be carried out within the time interval between the registering of the hologram and the beginning of preparation of the respective recording unit for a new operation cycle.

In the case the communication line 4 in FIG. 14 is used for transmitting color images, the subscriber station 1 operates as follows.

The switching means 6, 59 and 60 form two-dimensional pulse units on each of the three color subcarriers generated in the sources 2, 57 and 58, one pair of pulse units of each color adjoining a pair of pulse units of another color, which forms $3 \times 2 = 6$ successively generated pulses which are directed by the unit 61 into one optical channel. The unit 7 then directs the three useful signals and the three reference signals into physically different channels. In the two-dimensional useful signal channel the color pulse units are modulated by the useful signals in the modulator 9, each color pulse unit being modulated by a signal corresponding to the respective color. In the two-dimensional reference signal channel the unit 8 carries out required spatial modulation of the three reference signals passing successively through said unit.

The unit 11 directs the formed useful and reference signals into one optical channel. Further passage of signals through the communication line 4 is as described above.

The received signals are divided in the unit 16 into a group of three reference signals and a group of three useful signals. After one of the groups has passed through the delay unit 17, the units 62 and 63 direct the color subcarries to three physically different channels, there being separate channels for the useful signals and the reference signal. The reference signal and the useful signal of one color are matched in space in the units 18, 64 and 65. After that the amplifiers 19, 66 and 67 amplify the interference pattern or the hologram, and the hologram is recorded in the units 20, 68 and 69.

The additional coherent light sources 22, 70 and 71 illuminate the recorded holograms on the three color subcarriers each illuminating the hologram of its respective color. The unit 72 matches in space the reproduced undistorted useful signals, and the color image thus obtained is registered in the unit 21.

Discussed hereinbelow is an example of an embodiment of a system for carrying out the method of the present invention, which system utilizes a communication line constructed as a multimode light guide.

If the size of the image being transmitted is, for example, 24 mm × 36 mm, the light guide 40 in FIG. 15 constructed as a pipe with mirror reflection internal walls may have a diameter of, for example, 300 mm.

Assume that the resolution element of the image being transmitted is $2.4 \times 10^{-3}$ cm. The divergence of the light beams whose dimensions correspond to those of the resolution element results from the fact that part of the rays travel in the light guide 40 in a straight line, whereas the other part is re-reflected from the walls of the light guide 40, even if the latter has no bends.

If the coefficient of reflection from the walls is assumed to be equal to 0.999 (which may actually be the case for oblique incidence even without a special wall coating), the 1-fold attenuation will be observed after about 1,000 reflections.

The distance 1 covered by the light flux till it is re-reflected for the first time may be found by the formula:

$$\phi = (2dD/\lambda) \quad (9)$$

wherein $d$ is the size of the resolution element;

$D$ is the cross-section size of the light guide 40; and $\lambda$ is the wavelength of the light carrier.

For $d = 2.4 \cdot 10^{-3}$ cm, $D = 30$ cm, and $\lambda = 0.6 \cdot 10^{-4}$ cm, $1 = 24$ m. Thus, the 1-fold attenuation of the signal will be observed after the signal covers a distance of about 24 km = $10^3$ l.

The minimum duration of the signals being transmitted is determined by the distance over which the transmission is carried out, the diameter of the light guide 40, and the number of re-reflections in the light guide 40, including those due to the bends in the light guide and imperfections of its internal surface. The light pulse being transmitted is diluted with time, due to the fact that rays that have been reflected from the light guide walls a differnt number of times cover different distances. The maximum increment in the propagation distance ($\Delta L$) of a reflected ray, as compared to a ray that travels in a straight line, is found by the formula:

$$\Delta L = (L\lambda^2/8d^2) \quad (10)$$

where $L$ is the length of the light guide 40.

For $L = 24$ km, $\lambda = 0.6 \cdot 10^{-4}$ cm, and $d = 2.4 \cdot 10^{-3}$ cm, the maximum increment in the propagation distance amounts to about 2 m. This increment determines the minimum duration of the signals, which in the present case is about $0.66 \cdot 10^{-8}$ sec, considering that light covers a distance of one meter in $0.33 \cdot 10^{-8}$ sec. Assuming that the time interval between the two-dimensional reference signal and the two-dimensional useful signal equals $10^{-8}$ sec, it is clear that the total information transmission time including the reference and useful signals amounts to about $\tau = 2.3 \cdot 10^{-8}$ sec. If it is assumed that the interval between the reference signal and the useful signal is $10^{-8}$ sec, the communication line 40, which is 24 km long and is constructed from a material having a temperature coefficient of $5 \cdot 10^{-4}$, allows a temperature variation rate of more than 1 degree per second considering that the permissible phase progression is 36°. This is greater by far than the actual temperature variations of the surrounding medium.

For the cross-sectional size of the resolution element being equal to $2.4 \cdot 10^{-3}$ cm, which corresponds to a definition of 1,000 lines for a frame of $24 \times 36$ mm$^2$, the communication line's traffic capacity amounts to about $4 \cdot 10^7$ frames per second, which makes it possible to transmit through a single light guide, at a frequency of 25 frames per second, about $16 \cdot 10^5$ black-and-white television programs and about $5 \cdot 10^5$ color television programs with a definition of 1,000 lines for each color.

Taking into account the spectrum of the frequencies being transmitted $\Delta f \approx (2/\tau) = 10^8$ Hz, it is clear that apart from time separation of the transmission channels, frequency separation is also feasible. In this case the traffic capacity of the communication line using the spectrum of the visible electromagnetic radiation will be upwards of $10^{22}$ bits per second.

In transmitting three-dimensional holographic images, the utilization of three discrete color carriers provides in the present example for a traffic capacity of about 600 channels with a definition of 1,000 lines for all the three coordinates.

The proposed method and system may serve as a basis for contructing a communication system employing optical frequencies, which system will be capable of using novel, hitherto unknown, ways of transmitting over long distances diverse two-dimensional information. This system will have an exceptionally great traffic capacity, unknown in conventional systems or those that are at present in the design stage.

The construction of such communication systems will for the first time make it possible to build, at the present-day stage of technological progress, mass-scale videotelephone communication networks. It will make it possible to conduct three-dimensional holographic TV broadcasts, as well as maintain complete secrecy of information being transmitted.

What is claimed is:

1. A method for transmitting two-dimensional information about an object comprising the steps of:
    forming a two-dimensional useful signal by means of two-dimensional spatial modulation of a coherent light flux;
    forming a two-dimensional reference signal;
    transmitting said useful signal and said reference signal through a communication line;
    said reference signal being displaced with respect to said two-dimensional useful signal by a time interval not in excess of the time instability interval of said communication line through which said signals are successively transmitted;
    carrying out combined processing of the received two-dimensional reference signal and the received two-dimensional useful signal at the receiving end of said communication line so as to ensure compensation of identical distortions introduced by said communication line into said two-dimensional reference signal and said two-dimensional useful signal, wherein said combined processing of said two-dimensional reference signal and said two-dimensional useful signal is carried out by matching in time and space the received two-dimensional reference signal and the received two-dimensional useful signal and recording a hologram of the received two-dimensional useful signal in relation to the received two-dimensional reference signal, which hologram, when restored, makes it possible to obtain the undistorted two-dimensional information that has been transmitted, wherein said two-dimensional reference signal and said two-dimensional useful signal are periodically subjected to spatial randomization in said communication line.

2. A method for transmitting two-dimensional information about an object comprising the steps of:
    forming a two-dimensional useful signal by means of two-dimensional spatial modulation of a coherent light flux;
    forming a two-dimensional reference signal;
    transmitting said useful signal and said reference signal through a communication line;
    said reference signal being displaced with respect to said two-dimensional useful signal by a time interval not in excess of the time instability interval of said communication line through which said signals are successively transmitted;
    carrying out combined processing of the received two-dimensional reference signal and the received two-dimensional useful signal at the receiving end of said communication line so as to ensure compensation of identical distortions introduced by said communication line into said two-dimensional reference signal and said two-dimensional useful signal, wherein said combined processing of said two-dimensional reference signal and said two-dimensional useful signal is carried out by matching in time and space the received two-dimensional reference signal and the received two-dimensional useful signal and recording a hologram of the received two-dimensional useful signal in relation to the received two-dimensional reference signal, which hologram, when restored, makes it possible to obtain the undistorted two-dimensional information that has been transmitted, wherein the formation of said two-dimensional useful signal is preceded by recording a two-dimensional hologram of a three-dimensional object; said two-dimensional hologram being used for said two-dimensional spatial modulation of said coherent light flux, said combined processing of the received two-dimensional reference signal and said received two-dimensional useful signal being accompanied by additional restoration of the three-dimensional image of said object in accordance with said hologram.

3. A method for transmitting two-dimensional information about an object comprising the steps of:
 forming a two-dimensional useful signal by means of two-dimensional spatial modulation of a coherent light flux;
 forming a two-dimensional reference signal;
 transmitting said useful signal and said reference signal through a communication line;
 said reference signal being displaced with respect to said two-dimensional useful signal by a time interval not in excess of the time instability interval of said communication line through which said signals are successively transmitted;
 carrying out combined processing of the received two-dimensional reference signal and the received two-dimensional useful signal at the receiving end of said communication line so as to ensure compensation of identical distortions introduced by said communication line into said two-dimensional reference signal and said two-dimensional useful signal, wherein said combined processing of the two-dimensional reference signal and the two-dimensional useful signal further comprises the steps of:
 recording a Fourier hologram of said two-dimensional useful signal and an inverse Fourier hologram of said two-dimensional reference signal;
 successively modulating an additional coherent light flux by said Fourier holograms;
 subsequently inverse Fourier transforming said modulated light flux;
 whereby restoration of the undistorted information being transmitted is ensured.

4. The method as defined in claim 3, wherein said two-dimensional reference signal and said two-dimensional useful signal are periodically subjected to spatial randomization in said communication line.

5. The method as defined in claim 3, wherein said two-dimensional reference signal and said two-dimensional useful signal are additionally formed on at least two subcarrier frequencies; whereby it is possible to transmit two-dimensional color information.

6. The method as defined in claim 3, wherein the formation of said two-dimensional useful signal is preceded by recording a two-dimensional hologram of a three-dimensional object said hologram being used for said two-dimensional spatial modulation of said coherent light flux, said combined processing of the received two-dimensional reference signal and said received two-dimensional useful signal being accompanied by additional restoration of the three-dimensional image of said object according to said hologram.

7. A system for transmitting two-dimensional information at optical frequencies, which system comprises:
 a subscriber station;
 a first coherent light source of said subscriber station;
 transmitting means of said subscriber station, arranged along the path of the coherent light flux downstream of said coherent light source, said transmitting means receiving the coherent light flux from said coherent light source;
 a communication line extending along the path of said coherent light flux downstream of said transmitting means;
 said transmitting means comprising first switching means, installed directly downstream of said coherent light source, said switching means receiving said coherent light flux and using the latter to form successive two-dimensional coherent light pulses which comprise a two-dimensional reference signal and a two-dimensional useful signal, which useful signal carries two-dimensional information being transmitted, the total duration of said light pulses not being in excess of the time instability interval of said communication line;
 said transmitting means further comprising spatial separating means installed directly downstream of said switching means along the path of said coherent light flux, said spatial separating means receiving said light pulses from said switching means and directing said light pulses to a two-dimensional reference signal channel and a two-dimensional useful signal channel, respectively;
 a unit for forming said two-dimensional reference signal, arranged in said two-dimensional reference signal channel, said unit including means for receiving from said spatial separating means said light pulse corresponding to the two-dimensional reference signal;
 a modulator arranged in said two-dimensional useful signal channel, said modulator receiving from said spatial separating means said light pulse corresponding to the two-dimensional useful signal and modulating said light pulse by the two-dimensional useful signal;
 a unit for optimum matching the spatial spectrum of the two-dimensional useful signal with the two-dimensional mathematical operator of the transmission function of said communication line, said optimum matching unit also arranged in said two-dimensional useful signal channel, directly downstream of said modulator, along the path of said coherent light flux, said optimum matching unit including means for receiving a signal from said modulator;
 said transmitting means further comprising means for spatial matching of said two-dimensional reference signal and said two-dimensional useful signal, said spatial matching means being located along the path of said coherent light flux, directly downstream of said two-dimensional reference signal channel and two-dimensional useful signal channel, said reference signal and said useful signal arriving at said spatial matching means from their respective channels;
 said transmitting means further comprising controlled means for inputting said two-dimensional reference signal and said two-dimensional useful signal, arriving from said spatial matching means, into said communication line along the path of said coherent light flux, of said subscriber station, downstream of said communication line and receiving signals from said communication line;

receiving means for converting said two-dimensional reference signal and said two-dimensional useful signal into said two-dimensional information, said receiving means comprising means for controlling output of said two-dimensional reference signal and said two-dimensional useful signal from said communication line;

second switching means of said receiving means, installed directly downstream of said means for controlling output, along the path of said coherent light flux, said second switching means comprising means for receiving signals from said means for controlling output and discriminating in time the two-dimensional reference signal and the two-dimensional useful signal;

a unit for processing these signals, which is also part of said receiving means and installed directly downstream of said second switching means, along the path of said coherent light flux, said processing unit receiving signals from said second switching means and compensating distortions introduced by said communication line into the two-dimensional information being transmitted, said processing unit further comprising means for recording and reproducing said information, wherein said unit for processing said reference and useful signals comprises in successive arrangement along the path of said coherent light flux: a spatial separation unit for directing said signals to the two-dimensional reference signal channel and the two-dimensional useful signal channel; respectively, which spatial separation unit receives signals from said second switching means; a delay unit for matching in time the two-dimensional reference signal and the two-dimensional useful signal, which delay unit is disposed in one of said channels; a unit for spatial matching of said two-dimensional reference signal and said two-dimensional useful signal, which unit receives said signals from their respective channels; a unit for recording a hologram of said two-dimensional useful signal, which hologram is obtained as a result of interference of said two-dimensional reference signal and said two-dimensional useful signal, which hologram recording unit receives said signals from said spatial matching unit; a unit for reproducing from said hologram the two-dimensional information being transmitted, which reproduction unit receives signals from said recording unit; a second coherent light source also part of said processing unit, wherefrom the coherent light flux travels to said recording unit.

8. The system as defined in claim 7, wherein there is provided a non-coherent amplifier of the light flux, installed along the path of said coherent light flux, downstream of said unit for spatial matching of said two-dimensional reference signal and said two-dimensional useful signal.

9. A system for transmitting two-dimensional information at optical frequencies, which system comprises:
a subscriber station;
a first coherent light source of said subscriber station;
transmitting means of said subscriber station, arranged along the path of the coherent light flux downstream of said coherent light source, said transmitting means receiving the coherent light flux from said coherent light source;
a communication line extending along the path of said coherent light flux downstream of said transmitting means;
said transmitting means comprising first switching means, installed directly downstream of said coherent light source, said switching means receiving said coherent light flux and using the latter to form successive two-dimensional coherent light pulses which comprise a two-dimensional reference signal and a two-dimensional useful signal, which useful signal carries two-dimensional information being transmitted, the total duration of said light pulses not being in excess of the time instability interval of said communication line;
said transmitting means further comprising spatial separating means installed directly downstream of said switching means along the path of said coherent light flux, said spatial separating means receiving said light pulses from said switching means and directing said light pulses to a two-dimensional reference signal channel and a two-dimensional useful signal channel, respectively;
a unit for forming said two-dimensional reference signal, arranged in said two-dimensional reference signal channel, said unit including means for receiving from said spatial separating means said light pulse corresponding to the two-dimensional reference signal;
a modulator arranged in said two-dimensional useful signal channel, said modulator receiving from said spatial separating means said light pulse corresponding to the two-dimensional useful signal and modulating said light pulse by the two-dimensional useful signal;
a unit for optimum matching the spatial spectrum of the two-dimensional useful signal with the two-dimensional mathematical operator of the transmission function of said communication line, said optimum matching unit also arranged in said two-dimensional useful signal channel, directly downstream of said modulator, along the path of said coherent light flux, said optimum matching unit including means for receiving a signal from said modulator;
said transmitting means further comprising means for spatial matching of said two-dimensional reference signal and said two-dimensional useful signal, said spatial matching means being located along the path of said coherent light flux, directly downstream of said two-dimensional reference signal channel and two-dimensional useful signal channel, said reference signal and said useful signal arriving at said spatial matching means from their respective channels;
said transmitting means further comprising controlled means for inputting said two-dimensional reference signal and said two-dimensional useful signal, arriving from said spatial matching means, into said communication line, along the path of said coherent light flux of said subscriber station, downstream of said communication line and receiving signals from said communication line;

receiving means for converting said two-dimensional reference signal and said two-dimensional useful signal into said two-dimensional information, said receiving means comprising means for controlling output of said two-dimensional reference signal and said two-dimensional useful signal from said communication line;

second switching means of said receiving means, installed directly downstream of said means for controlling output, along the path of said coherent light flux, said second switching means comprising means for receiving signals from said means for controlling output and discriminating in time the two-dimensional reference signal and the two-dimensional useful signal;

a unit for processing these signals, which is also part of said receiving means and installed directly downstream of said second switching means, along the path of said coherent light flux, said processing unit receiving signals from said second switching means and compensating distortions introduced by said communication line into the two-dimensional information being transmitted, said processing unit further comprising means for recording and reproducing said information, wherein said unit for processing the two-dimensional reference signal and the two-dimensional useful signal comprises, in successive arrangement along the path of said coherent light flux: a unit for spatial Fourier transforming said signals, said signals arriving thereat from said switching means; a spatial separation unit for directing said signals to the two-dimensional reference signal channel and the two-dimensional useful signal channel, respectively, which spatial separation unit receives said signals from said spatial transforming unit; a unit for recording an inverse Fourier hologram of said two-dimensional reference signal, the two-dimensional reference signal arriving thereat from said spatial separation unit; a unit for recording a Fourier hologram of said two-dimensional useful signal, said two-dimensional useful signal arriving at said unit from said spatial separation unit; a second coherent light source, which is also part of said processing unit, wherefrom the coherent light flux travels successively through both recording units, wherein it is successively modulated by said Fourier halograms of the two-dimensional useful signal and the two-dimensional reference signal; a unit for inverse Fourier transforming the modulated light flux, which unit is incorporated in said processing unit, the coherent light flux from said second coherent light source arriving at said unit for inverse Fourier transforming after it has passed through both recording units; a unit for reproducing the two-dimensional information being transmitted from said Fourier holograms, which unit is part of said processing unit, the coherent light flux from said second coherent light source arriving at said reproduction unit after it has passed through said unit for inverse Fourier transforming of the modulated light flux.

10. A system for transmitting two-dimensional information at optical frequencies, which system comprises:

a subscriber station;

a first coherent light source of said subscriber station;

transmitting means of said subscriber station, arranged along the path of the coherent light flux downstream of said coherent light source, said transmitting means receiving the coherent light flux said coherent light source;

a communication line extending along the path of said coherent light flux downstream of said transmitting means;

said transmitting means comprising first switching means, installed directly downstream of said coherent light source, said switching means receiving said coherent light flux and using the latter to form successive two-dimensional coherent light pulses which comprise a two-dimensional reference signal and a two-dimensional useful signal, which useful signal carries two-dimensional information being transmitted, the total duration of said light pulses not being in excess of the time instability interval of said communication line;

said transmitting means further comprising spatial separating means installed directly downstream of said switching means along the path of said coherent light flux, said spatial separating means receiving said light pulses from said switching means and directing said light pulses to a two-dimensional reference signal channel and a two-dimensional useful signal channel, respectively;

a unit for forming said two-dimensional reference signal, arranged in said two-dimensional reference signal channel, said unit including means for receiving from said spatial separating means said light pulse corresponding to the two-dimensional reference signal;

a modulator arranged in said two-dimensional useful signal channel, said modulator receiving from said spatial separating means said light pulse corresponding to the two-dimensional useful signal and modulating said light pulse by the two-dimensional useful signal;

a unit for optimum matching the spatial spectrum of the two-dimensional useful signal with the two-dimensional mathematical operator of the transmission function of said communication line, said optimum matching unit also arranged in said two-dimensional useful signal channel, directly downstream of said modulator, along the path of said coherent light reflux, said optimum matching unit including means for receiving a signal from said modulator;

said transmitting means further comprising means for spatial matching of said two-dimensional reference signal and said two-dimensional useful signal, said spatial matching means being located along the path of said coherent light flux, directly downstream of said two-dimensional reference signal channel and two-dimensional useful signal channel, said reference signal and said useful signal arriving at said spatial matching means from their respective channels;

said transmitting means further comprising controlled means for inputting said two-dimensional reference signal and said two-dimensional useful signal, arriving from said spatial matching means, into said communication line, along the path of said coherent light flux of said subscriber station, downstream of said communication line and receiving signals from said communication line;

receiving means for converting said two-dimensional reference signal and said two-dimensional useful signal into said two-dimensional information, said receiving means comprising means for controlling output of said two-dimensional reference signal and said two-dimensional useful signal from said communication line;

second switching means of said receiving means, installed directly downstream of said means for controlling output, along the path of said coherent light flux, said second switching means comprising means for receiving signals from said means for controlling output and discriminating in time the two-dimensional reference signal and the two-dimensional useful signal;

a unit for processing these signals, which is also part of said receiving means and installed directly downstream of said second switching means, along the path of said coherent light flux, said processing unit receiving signals from said second switching means and compensating distortions introduced by said communication line into the two-dimensional information being transmitted, said processing unit further comprising means for recording and reproducing said information, which system further comprises:

a coder incorporated in said transmitting means and arranged along the path of said coherent flux in said two-dimensional useful signal channel, immediately downstream of said optimum matching unit;

said coder being constructed as a plate with a predetermined phase distribution of a transmission coefficient;

a decoder incorporated in said receiving means and arranged in the two-dimensional useful signal channel of said receiving means;

said decoder being constructed as a plate with a phase distribution of a transmission coefficient being in complex conjugation with the transmission coefficient of said coder.

11. A system for transmitting two-dimensional information at optical frequencies, which system comprises:

a subscriber station;

a first coherent light source of said subscriber station;

transmitting means of said subscriber station, arranged along the path of the coherent light flux downstream of said coherent light source, said transmitting means receiving the coherent light flux from said coherent light source;

a communication line extending along the path of said coherent light flux downstream of said transmitting means;

said transmitting means comprising first switching means, installed directly downstream of said coherent light source, said switching means receiving said coherent light flux and using the latter to form successive two-dimensional coherent light pulses which comprise a two-dimensional reference signal and a two-dimensional useful signal, which useful signal carries two-dimensional information being transmitted, the total duration of said light pulses not being in excess of the time instability interval of said communication line;

said transmitting means further comprising spatial separating means installed directly downstream of said switching means along the path of said coherent light flux, said spatial separating means receiving said light pulses from said switching means and directing said light pulses to a two-dimensional reference signal channel and a two-dimensional useful signal channel, respectively;

a unit for forming said two-dimensional reference signal, arranged in said two-dimensional reference signal channel, said unit including means for receiving from said spatial separating means said light pulse corresponding to the two-dimensional reference signal;

a modulator arranged in said two-dimensional useful signal channel, said modulator receiving from said spatial separating means said light pulse corresponding to the two-dimensional useful signal, and modulating said light pulse by the two-dimensional useful signal;

a unit for optimum matching the spatial spectrum of the two-dimensional useful signal with the two-dimensional mathematical operator of the transmission function of said communication line, said optimum matching unit also arranged in said two-dimensional useful signal channel, directly downstream of said modulator, along the path of said coherent light flux, said optimum matching unit including means for receiving a signal from said modulator;

said transmitting means further comprising means for spatial matching of said two-dimensional reference signal and said two-dimensional useful signal, said spatial matching means being located along the path of said coherent light flux, directly downstream of said two-dimensional reference signal channel and two-dimensional useful signal channel, said reference signal and said useful signal arriving at said spatial matching means from their respective channels;

said transmitting means further comprising controlled means for inputting said two-dimensional reference signal and said two-dimensional useful signal, arriving from said spatial matching means, into said communication line, along the path of said coherent light flux of said subscriber station, downstream of said communication line and receiving signals from said communication line;

receiving means for converting said two-dimensional reference signal and said two-dimensional useful signal into said two-dimensional information, said receiving means comprising means for controlling output of said two-dimensional reference signal and said two-dimensional useful signal from said communication line;

second switching means of said receiving means, installed directly downstream of said means for controlling output, along the path of said coherent light flux, said second switching means comprising means for receiving signals from said means for controlling output and discriminating in time the two-dimensional reference signal and the two-dimensional useful signal;

a unit for processing these signals, which is also part of said receiving means and installed directly downstream of said second switching means, along the path of said coherent light flux, said processing unit receiving signals from said second switching means and compensating distortions introduced by said communication line into the two-dimensional information being transmitted, said processing unit further comprising means for recording and reproducing said information, which further comprises: at least one more subscriber station; a time synchronization unit common for all the subscriber stations, which time synchronization unit generates synchrosignals for said subscriber stations, which synchrosignals are transmitted through said communication line on a separate light carrier; a selector incorporated in each receiving means of said subscriber stations, said selector receiving from said communication line said synchrosignals and controlling said second switching means of the receiving means wherein said selector is incorporated, which ensures time separation of operation of the respective subscriber stations.

12. The system as defined in claim 11, wherein each said controlled input and output units for directing said two-dimensional reference signal and said two-dimensional useful signal into and out of said communication line, respectively, is constructed as a semitransparent mirror; said semitransparent mirror being provided with a mechanism for shifting said mirror, which mechanism is electrically connected to said selector so that during operation of the respective subscriber station said mirror is in its working position.

13. The system as defined in claim 11, wherein each controlled input and output unit for directing said two-dimensional reference signal and said two-dimensional useful signal into and out of said communication line, respectively, is constructed as an optical deflector electrically coupled to said selector so that during operation of the respective subscriber station it reflects the two-dimensional reference signal and the two-dimensional useful signal, directing them to the input of said second switching means of said receiving means of said subscriber station.

14. A system for transmitting two-dimensional information at optical frequencies, which system comprises:
   a subscriber station;
   a first coherent light source of said subscriber station;
   transmitting means of said subscriber station, arranged along the path of the coherent light flux downstream of said coherent light source, said transmitting means receiving the coherent light flux from said coherent light source;
   a communication line extending along the path of said coherent light flux downstream of said transmitting means;
   said transmitting means comprising first switching means, installed directly downstream of said coherent light source, said switching means receiving said coherent light flux and using the latter to form successive two-dimensional coherent light pulses which comprise a two-dimensional reference signal and a two-dimensional useful signal, which useful signal carries two-dimensional information being transmitted, the total duration of said light pulses not being in excess of the time instability interval of said communication line;
   said transmitting means further comprising spatial separating means installed directly downstream of said switching means along the path of said coherent light flux, said spatial separating means receiving said light pulses from said switching means and directing said light pulses to a two-dimensional reference signal channel and a two-dimensional useful signal channel, respectively;
   a unit for forming said two-dimensional reference signal, arranged in said two-dimensional reference signal channel, said unit including means for receiving from said spatial separating means said light pulse corresponding to the two-dimensional reference signal;
   a modulator arranged in said two-dimensional useful signal channel, said modulator receiving from said spatial separating means said light pulse corresponding to the two-dimensional useful signal and modulating said light pulse by the two-dimensional useful signal;
   a unit for optimum matching the spatial spectrum of the two-dimensional useful signal with the two-dimensional mathematical operator of the transmission function of said communication line, said optimum matching unit also arranged in said two-dimensional useful signal channel, directly downstream of said modulator, along the path of said coherent light flux, said optimum matching unit including means for receiving a signal from said modulator;
   said transmitting means further comprising means for spatial matching of said two-dimensional reference signal and said two-dimensional useful signal, said spatial matching means being located along the path of said coherent light flux, directly downstream of said two-dimensional reference signal channel and two-dimensional useful signal channel, said reference signal and said useful signal arriving at said spatial matching means from their respective channels;
   said transmitting means further comprising controlled means for inputting said two-dimensional reference signal and said two-dimensional useful signal, arriving from said spatial matching means, into said communication line, along the path of said coherent light flux of said subscriber station, downstream of said communication line and receiving signals from said communication line;
   receiving means for converting said two-dimensional reference signal and said two-dimensional useful signal into said two-dimensional information, said receiving means comprising means for controlling output of said two-dimensional reference signal and said two-dimensional useful signal from said communication line;
   second switching means of said receiving means, installed directly downstream of said means for controlling output, along the path of said coherent light flux, said second switching means comprising means for receiving signals from said means for controlling output and discriminating in time the two-dimensional reference signal and the two-dimensional useful signal;
   a unit for processing these signals, which is also part of said receiving means and installed directly downstream of said second switching means, along the path of said coherent light flux, said processing unit receiving signals from said second switching means and compensating distortions introduced by said communication line into the two-dimensional information being transmitted, said processing unit further comprising means for recording and reproducing said information, wherein said communication line is constructed as a light guide having mirror reflection internal walls which ensure propagation of said two-dimensional reference signal and said two-dimensional useful signal by way of re-reflection from said walls of said light guide having a cross-section which is substantially larger than the aperture of the two-dimensional useful signal introduced into said light guide, wherein arranged in said light guide, across the path of said two-dimensional reference signal and said two-dimensional useful signal, is at least one more plate with a phase distribution of a transmission coefficient, which plate reduces the effects of regular non-uniformities of said light guide and ensures retrieval of the two-dimensional information being transmitted from any portion of the aperture of said light guide.

15. A system for transmitting two-dimensional information at optical frequencies, which system comprises:

a subscriber station;

a first coherent light source of said subscriber station;

transmitting means of said subscriber station, arranged along the path of the coherent light flux downstream of said coherent light source, said transmitting means receiving the coherent light flux from said coherent light source;

a communication line extending along the path of said coherent light flux downstream of said transmitting means;

said transmitting means comprising first switching means, installed directly downstream of said coherent light source, said switching means receiving said coherent light flux and using the latter to form successive two-dimensional coherent light pulses which comprise a two-dimensional reference signal and a two-dimensional useful signal, which useful signal carries two-dimensional information being transmitted, the total duration of said light pulses not being in excess of the time instability interval of said communication line;

said transmitting means further comprising spatial separating means installed directly downstream of said switching means along the path of said coherent light flux, said spatial separating means receiving said light pulses from said switching means and directing said light pulses to a two-dimensional reference signal channel and a two-dimensional useful signal channel, respectively;

a unit for forming said two-dimensional reference signal, arranged in said two-dimensional reference signal channel, said unit including means for receiving from said spatial separating means said light pulse corresponding to the two-dimensional reference signal;

a modulator arranged in said two-dimensional useful signal channel, said modulator receiving from said spatial separating means said light pulse corresponding to the two-dimensional useful signal and modulating said light pulse by the two-dimensional useful signal;

a unit for optimum matching the spatial spectrum of the two-dimensional useful signal with the two-dimensional mathematical operator of the transmission function of said communication line, said optimum matching unit also arranged in said two-dimensional useful signal channel, directly downstream of said modulator, along the path of said coherent light flux, said optimum matching unit including means for receiving a signal from said modulator;

said transmitting means further comprising means for spatial matching of said two-dimensional reference signal and said two-dimensional useful signal, said spatial matching means being located along the path of said coherent light flux, directly downstream of said two-dimensional reference signal channel and two-dimensional useful signal channel, said reference signal and said useful signal arriving at said spatial matching means from their respective channels;

said transmitting means further comprising controlled means for inputting said two-dimensional reference signal and said two-dimensional useful signal, arriving from said spatial matching means, into said communication line, along the path of said coherent light flux of said subscriber station, downstream of said communication line and receiving signals from said communication line;

receiving means for converting said two-dimensional reference signal and said two-dimensional useful signal into said two-dimensional information, said receiving means comprising means for controlling output of said two-dimensional reference signal and said two-dimensional useful signal from said communication line;

second switching means of said receiving means, installed directly downstream of said means for controlling output, along the path of said coherent light flux, said second switching means comprising means for receiving signals from said means for controlling output and discriminating in time the two-dimensional reference signal and the two-dimensional useful signal;

a unit for processing these signals, which is also part of said receiving means and installed directly downstream of said second switching means, along the path of said coherent light flux, said processing unit receiving signals from said second switching means and compensating distortions introduced by said communication line into the two-dimensional information being transmitted, said processing unit further comprising means for recording and reproducing said information, wherein said communication line is constructed as a light guide having mirror reflection internal walls which ensure propagation of said two-dimensional reference signal and said two-dimensional useful signal by way of re-reflection from said walls of said light guide having a cross-section which is substantially larger than the aperture of the two-dimensional useful signal introduced into said light guide, wherein the internal surface of said light guide has evenly spaced optically black portions.

16. A system for transmitting two-dimensional information at optical frequencies, which system comprises:

a subscriber station;

a first coherent light source of said subscriber station;

transmitting means of said subscriber station, arranged along the path of the coherent light flux downstream of said coherent light source, said transmitting means receiving the coherent light flux from said coherent light source;

a communication line extending along the path of said coherent light flux downstream of said transmitting means;

said transmitting means comprising first switching means, installed directly downstream of said coherent light source, said switching means receiving said coherent light flux and using the latter to form successive two-dimensional coherent light pulses which comprise a two-dimensional reference signal and a two-dimensional useful signal, which useful signal carries two-dimensional information being transmitted, the total duration of said light pulses not being in excess of the time instability interval of said communication line;

said transmitting means further comprising spatial separating means installed directly downstream of said switching means along the path of said coherent light flux, said spatial separating means receiving said light pulses from said switching means and directing said light pulses to a two-dimensional reference signal channel and a two-dimensional useful signal channel, respectively;

a unit for forming said two-dimensional reference signal, arranged in said two-dimensional reference signal channel, said unit including means for receiving from said spatial separating means said light pulse corresponding to the two-dimensional reference signal;

a modulator arranged in said two-dimensional useful signal channel, said modulator receiving from said spatial separating means and light pulse corresponding to the two-dimensional useful signal and modulating said light pulse by the two-dimensional useful signal;

a unit for optimum matching the spatial spectrum of the two-dimensional useful signal with the two-dimensional mathematical operator of the transmission function of said communication line, said optimum matching unit also arranged in said two-dimensional useful signal channel, directly downstream of said modulator, along the path of said coherent light flux, said optimum matching unit including means for receiving a signal from said modulator;

said transmitting means further comprising means for spatial matching of said two-dimensional reference signal and said two-dimensional useful signal, said spatial matching means being located along the path of said coherent light flux, directly downstream of said two-dimensional reference signal channel and two-dimensional useful signal channel, said reference signal and said useful signal arriving at said spatial matching means from their respective channels;

said transmitting means further comprising controlled means for inputting said two-dimensional reference signal and said two-dimensional useful signal, arriving from said spatial matching means, into said communication line, along the path of said coherent light flux of said subscriber station, downstream of said communication line and receiving signals from said communication line;

receiving means for converting said two-dimensional reference signal and said two-dimensional useful signal into said two-dimensional information, said receiving means comprising means for controlling output of said two-dimensional reference signal and said two-dimensional useful signal from said communication line;

second switching means of said reciving means, installed directly downstream of said means for controlling output, along the path of said coherent light flux, said second switching means comprising means for receiving signals from said means for controlling output and discriminating in time the two-dimensional reference signal and the two-dimensional useful signal;

a unit for processing these signals, which is also part of said receiving means and installed directly downstream of said second switching means, along the path of said coherent light flux, said processing unit receiving signals from said second switching means and compensating distortions introduced by said communication line into the two-dimensional information being transmitted, said processing unit further comprising means for recording and reproducing said information, wherein said communication line is constructed as a light guide having mirror reflection internal walls which ensure propagation of said two-dimensional reference signal and said two-dimensional useful signal by way of re-reflection from said walls of said light guide having a cross-section which is substantially larger than the aperture of the two-dimensional useful signal introduced into said light guide, wherein said light guide is constructed from separate, sealed and co-axially arranged pipe lengths abutting against each other; said pipe lengths being provided with optically transparent flanges filled with an inert gas.

17. The system as defined in claim 16, wherein arranged in said pipe lengths of said light guide, across the path of said two-dimensional reference signal and said two-dimensional useful signal, is at least one plate for reducing the effects of regular non-uniformities of said light guide and ensuring retrieval of the two-dimensional information being transmitted from any portion of the aperture of said light guide.

18. The system as defined in claim 16, wherein the internal surface of said pipe lengths of said light guide has evenly spaced optically black portions.

* * * * *